Figure 1A:
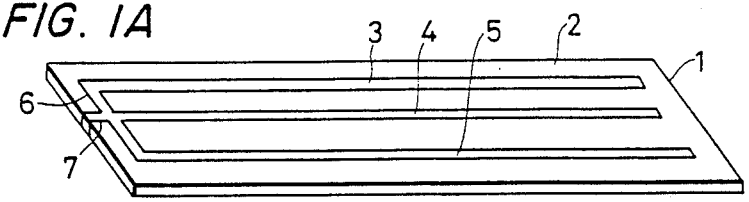

United States Patent [19]

Masuda et al.

[11] Patent Number: 4,922,099
[45] Date of Patent: May 1, 1990

[54] ELECTRIC FIELD DEVICE

[75] Inventors: Senichi Masuda, Tokyo; Isamu Fukuura, Nagoya, both of Japan

[73] Assignee: NGK Spark Plug Co., Ltd., Japan

[21] Appl. No.: 293,757

[22] Filed: Jan. 3, 1988

Related U.S. Application Data

[63] Continuation of Ser. No. 177,442, Apr. 4, 1988, which is a continuation of Ser. No. 528,854, Sep. 2, 1983, abandoned.

[30] Foreign Application Priority Data

Sep. 7, 1982 [JP] Japan ............................. 57-155618

[51] Int. Cl.$^5$ ............................................. H01T 19/00
[52] U.S. Cl. ..................................... 250/324; 361/230
[58] Field of Search ................. 250/324; 361/225, 226, 361/227, 230

[56] References Cited

U.S. PATENT DOCUMENTS

| | | |
|---|---|---|
| 3,004,197 | 10/1961 | Rodriguez et al. . |
| 3,615,980 | 10/1971 | Schuck et al. ...................... 156/89 |
| 3,801,869 | 4/1974 | Masuda .................................. 317/3 |
| 3,841,264 | 10/1974 | Masuda . |
| 3,882,059 | 5/1975 | Elderbaum ........................ 29/25.42 |
| 3,930,815 | 1/1976 | Masuda . |
| 3,968,405 | 7/1976 | Testone . |
| 3,970,905 | 7/1976 | Itoh et al. ............................ 361/233 |
| 4,150,876 | 4/1979 | Yevick ................................. 350/338 |
| 4,155,093 | 5/1979 | Foltand et al. . |
| 4,210,949 | 7/1980 | Masuda et al. . |
| 4,265,641 | 5/1981 | Natarajan . |
| 4,325,763 | 4/1982 | Utsumi et al. ........................ 156/89 |
| 4,465,727 | 8/1984 | Fujita .................................. 428/138 |
| 4,497,677 | 2/1985 | Sanada et al. ........................ 156/89 |
| 4,652,318 | 3/1987 | Masuda et al. ...................... 250/324 |

FOREIGN PATENT DOCUMENTS

| | | |
|---|---|---|
| 2618243 | 11/1976 | Fed. Rep. of Germany . |
| 99242 | 1/1933 | Japan . |
| 51-103328 | 8/1976 | Japan . |
| 52-106400 | 9/1977 | Japan . |
| 52-108574 | 9/1977 | Japan . |
| 52-145838 | 12/1977 | Japan . |
| 981125 | 5/1979 | Japan . |
| 973106 | 9/1979 | Japan . |
| 54-42017 | 12/1979 | Japan . |
| 983218 | 1/1980 | Japan . |
| 1047574 | 10/1980 | Japan . |
| 55-154383 | 12/1980 | Japan . |
| 1048666 | 5/1981 | Japan . |
| 56-155419 | 9/1981 | Japan . |
| 57-6385 | 2/1982 | Japan . |
| 57-81779 | 5/1982 | Japan . |
| 1132134 | 5/1982 | Japan . |
| 1129856 | 12/1982 | Japan . |
| 1549055 | 10/1976 | United Kingdom . |

Primary Examiner—Bruce C. Anderson
Attorney, Agent, or Firm—Price, Heneveld, Cooper, DeWitt & Litton

[57] ABSTRACT

An electric field device is obtained by the steps of employing a highly pure and mechanically electrically chemically and thermally extremely durable ceramic material, such as a high purity alumina porcelain, as a dielectric material, disposing electrodes on the shaped material before sintering by a thick film printing technique, such as screen printing, with a dispersion ink of finely divided metal, e.g. tungsten, and sintering the shaped material integrally with the electrodes. The product is extremely dense, mechanically electrically chemically and thermally durable and highly reliable.

18 Claims, 18 Drawing Sheets

ELECTRIC FIELD DEVICE

This is a continuation of co-pending application Ser. No.177,442, filed on Apr. 4, 1988, now abandoned, which is in turn a continuation of copending application Ser. No. 528,854, filed on Sept. 2, 1983 now abandoned.

The present invention relates to various types of electric field devices employing fine ceramic dielectrics and a method for making the devices as well as an electrostatic treatment apparatus of object matters making use of the electric field device.

Devices in which electrodes are provided on a surface of or within a dielectric body, a D.C. high voltage or an A.C. high voltage (including a sinusoidal wave, a rectangular wave, and a pulse-shaped high voltage) are applied between these electrodes to produce phenomena inherent to an electric field such as gaseous discharge or electro-mechanical phenomena, have been in themselves well known, and these phenomena are utilized as an ion source for charging or discharging of object matters or utilized for electro-mechanical operations such as adhesion, repulsion or transportation of object matters caused by an electric force (hereinafter generally called "electric field device").

Examples of the electric field devices serving as an ion source, have been disclosed in Japanese patent or copending Japanese patent applications entitled at the old time "DENKITEKI GASU SEISEI SOCHI (Electric Gas Refining Device)" (Japanese Patent No. 99242), and recently "SEIDEN FUNTAI TOCHAKU SOCHI (Electrostatic Powder Painting Device)" (Japanese Patent Application No. 51-103328), "RYUSHI KADEN SOCHI (Particle Charging Device)" (Japanese Patent Application No- 52-106400), "JODEN SOCHI (Charge Removing Device)" (Japanese Patent Application No. 52-145838), and 'KANRO SHIKI JODEN SOCHI (Pipeline Type Charge Removing Device)" (Japanese Patent Application No. 56-155419). In addition, examples of the electric field devices for utilizing for electro-mechanical operations, have been disclosed in Japanese patents or copending Japanese patent applications entitled "SESSHOKU GATA DENKAI KATEN SOCHI (Contact Type Electric Field Curtain Device)" (Japanese Patent No. 983218), "SESSHOKU GATA DENKAI KATEN O MOCHIITA RYUSHI YUSO-KYOKYU SOCHI (Particle Transportation-Supply Device Making Use Of A Contact Type Electric Field Curtain)" (Japanese Patent No. 973106), "SESSHOKU GATA DENKAI KATEN O MOCHITE RYUSHI O TOCHAKUSURU HOHO NARABINI SONO SOCHI (Method For Depositing Particles By Making Use Of A Contact Type Electric Field Curtain And Apparatus For Practicing the Method)" (Japanese Patent No. 1009331), "SESSHOKU GATA DENKAI KATEN O KOSEISURU HOHO OYOBI KORE O RIYO SHITA SESSHOKU GATA DENKAI KATEN SOCHI (Method For Constructing A Contact Type Electric Field Curtain And A Contact Type Electric Field Curtain Device Making Use Of The Method)" (Japanese Patent No. 981125), "SESSHOKU GATA DENKAI KATEN O MOCHIITA SEIDEN FUNTAI TOCHAKU YO BUSU (Electrostatic Powder Painting Booth Making Use Of A Contact Type Electric Field Curtain)" (Japanese Patent No 1047574), "TAIDEN RYUSHI HASSEI SOCHI (Charged Particle Producing Device)" (Japanese Patent No. 1048666), "SAISEN GATA DENKAI SOCHI (Thin Wire Type Electric Field Device)" (Japanese Patent Publication No. 57-6385), "TANKYOKU DENKAI KATEN SOCHI (Monopolar Electric Field Curtain Device)" (Japanese Patent Publication No. 57-9856), "DENKAI KATEN SOCHI KARA NARU KABE (Wall Consisting Of Electric Field Curtain Devices)" (Japanese Patent Publication No. 57-24181), "ANZEN GATA DENKAI KATEN SOCHI (Safety Type Electric Field Curtain Device)" (Laid-Open Japanese Patent Specification No. 52-108574), and "ISSO ROSHUTSU GATA SESSHOKU GATA DENKAI KATEN SOCHI (One-Phase-Exposed Type AND Contact Type Electric Field Curtain Device)" (Japanese Patent Application No. 57-081779).

However, in common to all these electric field devices, a D.C. or A.C. electric field having an extremely high value is applied to a dielectric body on the surface of which an electrode is supported or within which an electrode is embedded and held, and especially concentration of the electric field in the proximity of the electrode is remarkable. As a result, in this concentrated electric field portion is generated local partial discharge, not only as a matter of course when the portion is exposed in the air but also even in the case where the portion is embedded within the dielectric body, and hence the dielectric material in this portion is subjected to bombardment by ions and electrons. In the case of employing the electric field device as an ion source, this action would naturally generate gaseous discharge on the electrode, and so, the action would become more and more remarkable. Also, if an A.C. voltage is applied to the electrode, the above-mentioned partial discharge becomes especially remarkable. However, in the electric field device in the prior art, because of ease in manufacture, in almost every case synthetic resin or shaped inorganic insulator bonded by synthetic resin was used as a dielectric. In such a case the organic dielectric material such as synthetic resin or the like was locally deteriorated by the ion bombardment or electron bombardment caused by the above-described partial discharge, especially when an A.C. high voltage was applied, the deterioration proceeded quickly in a tree shape resulting in growth of insulation defects called "treeing", and eventually it was enevitable that breakdown between the electrodes applied with a high voltage would be generated within a relatively short period of time. When inorganic insulator such as mica, ceramics, etc. is used in order to prevent such breakdown, although a life can be somewhat prolonged, not only it becomes difficult to perfectly embed an electrode within the insulator, but also as the structure of the insulator is not dense, when an interval or a thickness of an insulator portion is made thin for the purpose of enhancing an electric field effect, likewise breakdown would arise momentarily at a low voltage, and therefore, it was impossible to construct an effective electric field device. On the other hand, when glass was used as inorganic dielectric, though the aforementioned problem was resolved, it became mechanically brittle, moreover an anti-breakdown strength was also not sufficient, and furthermore, the shortcoming that the insulator was very easily broken by local temperature rise caused by application of an alternating electric field, could not be obviated As described above, in the prior art, since an appropriate material was not obtained, the electric field device had a very short life and a high cost, and the way of widely utilizing the electric field device has been closed.

One object of the present invention is to provide an electrostatic treatment apparatus of object matters which makes use of a long-life, highly reliable and less expensive electric field device or devices which are free from the above-described difficulties, and to make it possible to bring the electrostatic treatment apparatus into really practical use.

According to the present invention, the aforementioned object is achieved by making, an electric field device which is dense, mechanically electrically chemically and thermally durable and highly reliable through the steps of employing highly pure and ,mechanically electrically chemically and thermally extremely durable ceramic materials such as, for example, a high purity alumina porcelain or the like (hereinafter called "fine ceramic") as a dielectric material, disposing electrodes on the shaped material before sintering and sintering the shaped material integrally with the electrodes, and by using the made electric field device or devices in an electrostatic treatment apparatus of object matter.

With regard to the practical method, a method can be employed, in which when, for instance, high purity alumina porcelain is used, alumina preliminarily ground into powder having a grain diameter of several microns or less is bound by means of an organic binder, then a raw material sheet formed in a layer shape (called "green sheet") is produced, on the surface of the green sheet are formed electrodes by making use of an ink in which micro-fine powder of appropriate metal, for example, tungsten is dispersed with a thick film printing technique such as, for example, screen printing technique, the thus formed green sheet associated with electrode in itself singly, or after a plurality of such green sheets have been stacked and press-bonded, the formed multi-layer green sheet, is sintered within an appropriate reducing atmosphere such as a hydrogen furnace at a high temperature in the proximity of 1500° C.

In this case, by making the electric field device from a multilayer green sheet, it becomes possible to dispose a part of the electrodes as embedded in a sandwich form within the fine-ceramic dielectric in a single layer or in multiple layers, and thereby it becomes possible to achieve a high degree of electric field effect or ion formation effect, or to enhance a safety by internally embedding an electrode to be applied with a high voltage.

In addition, it becomes possible to effect electrical connection between front and rear surfaces of a monolayer or multilayer structure of fine ceramic dielectric layer penetrating therethrough by opening a small hole penetrating through a green sheet and sintering the green sheet after filling the small hole also with the aforementioned tungsten micro-fine powder ink or the like. Accordingly, thereby an electrode disposed on the front surface of the fine ceramic dielectric layer can be connected to an electrode for an lead wire disposed on its rear surface to achieve electrical connection to an external terminal.

For the fine ceramic dielectric material to be used according to the present invention, highly pure alumina porcelain having a purity of 90% or higher is preferable, but even among materials other than that material, any fine ceramic material could be employed so long as it is mechanically, electrically, chemically and thermally durable. When an electric field device is formed in a multilayer structure, it is possible to make it less expensive or to enhance its performance by using a high purity alumina porcelain layer, and an alumina porcelain layer having a relatively low purity and hence being less expensive in combination, by using fine ceramic materials of different kinds having different natures in different layers or at different locations in combination, or by using a fine ceramic material and the other dielectric materials (synthetic resin, mica, glass, ERP) in different layers or at different locations in combination.

While the surface of the electric field device according to the present invention could be used in the produced state, the electric field device may be subjected to improvement in the nature of the surface such as smoothening of the surface or creation of electrical conductivity by applying a suitable glaze on the surface, and in addition, the electric field device can be subjected to improvements in its surface nature by depositing a Teflon layer, a silicon layer and a surface layer of another appropriate material In addition, for the electrode material to be used according to the present invention, a high melting point metal that is easily integrated with the fine ceramic material used as a base material when they are sintered together and that has a coefficient of thermal expansion as close as that of the fine ceramic material, is preferable, and when the base material is high purity alumina porcelain, tungsten is most suitable. However depending upon the fine ceramic materials of various kinds, every suitable metallic material can be selectively used. Upon deposition of the electrode material onto the green sheet, although a thick film electrode could be formed through the technique of screen printing or the like with metal powder dispersed ink, in some cases a metallic electrode which has been preliminarily formed into a wire shape, a sheet shape or a foil shape could be deposited. In addition, a thin film electrode deposited by vapor-deposition or the like also can be used. Furthermore, the electrode material is not always limited to a metallic material, but as a matter of course, every suitable material such as carbon fibers, semiconductor ceramic material or the like can be used. Also the electrode material could have its surface plated with appropriate metal such as nickel for the purpose of preventing oxidation, protecting its surface or facilitating soldering, and moreover on the electrode itself could be thinly applied a glaze layer, an alumina insulator film or another surface layer.

With regard to the geometrical configuration of the novel electric field device according to the present invention, it can be formed and used not only in a plane shape but also in an arbitrary curved surface shape (spherical shape, semi-cylindrical shape, circular column shape, polygonal shape, step-like shape, etc.), and when practicing such a curved surface shape, in the stage of a green sheet associated with electrodes which is still rich in flexibility, the green sheet could be shaped into a desired configuration and then sintered.

The field of application of the electric field device according to the present invention extends over every one of charging and/or discharging apparatuses of object matters and electro-mechanical operation apparatuses of object matters, also the field of application involves all the subject matters of the Japanese patents and copending Japanese patent applications as referred to in the beginning of this specification, and furthermore, it involves all the methods and apparatuses for application of the electric field device which will appear in the future.

Figure 1B:
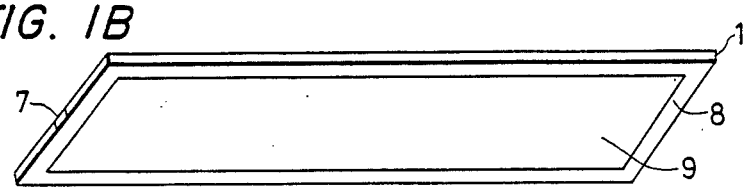
Figure 1C:
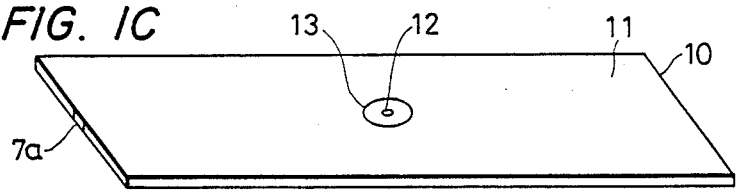
Figure 1D:
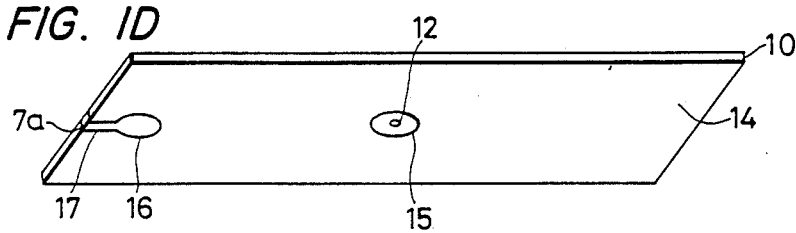
Figure 1E:
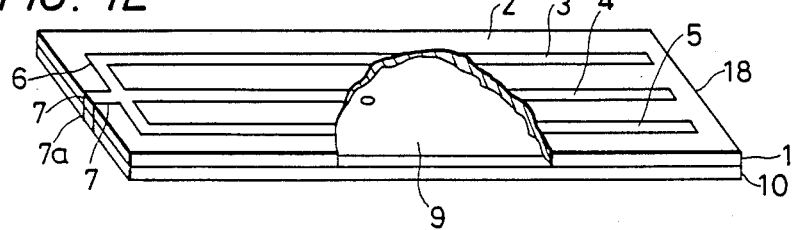
Figure 1F:
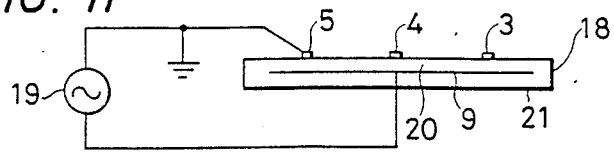
Figure 2:
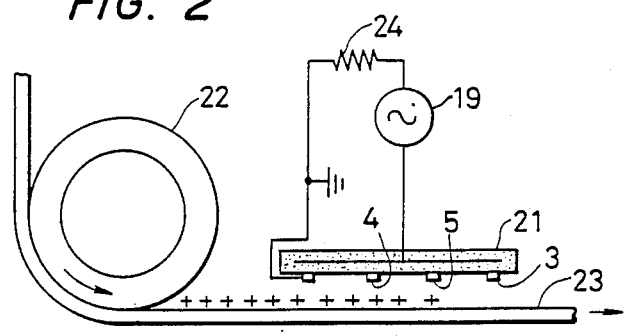
Figure 6:
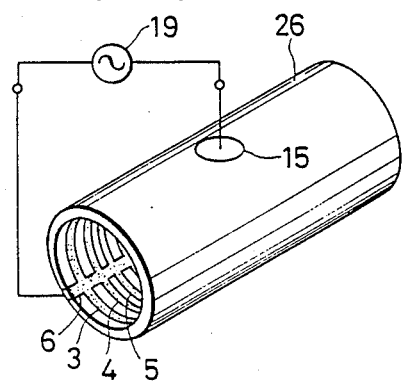
Figure 7A:
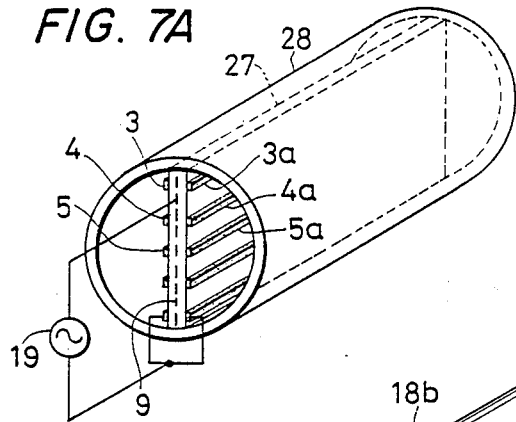
Figure 7B:
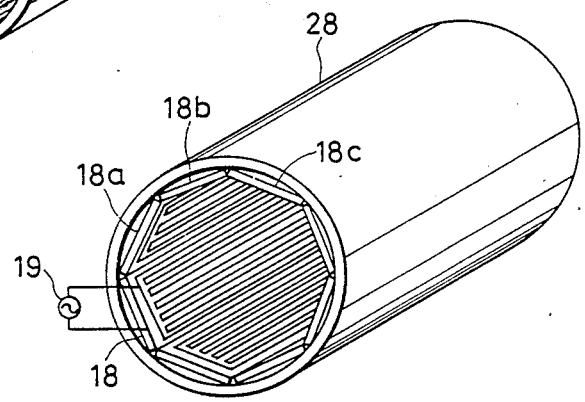
Figure 8:
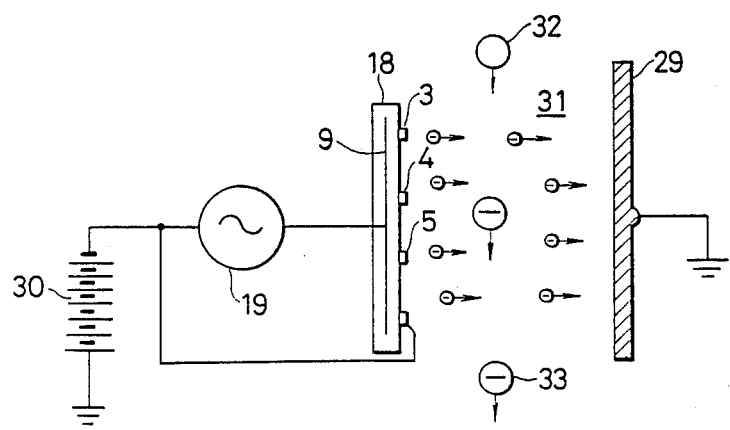
Figure 11:
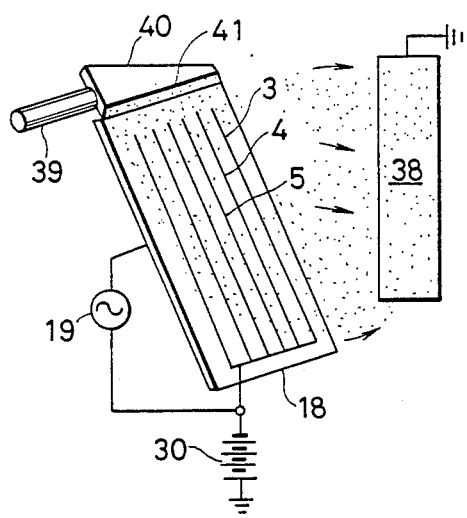
Figure 12:
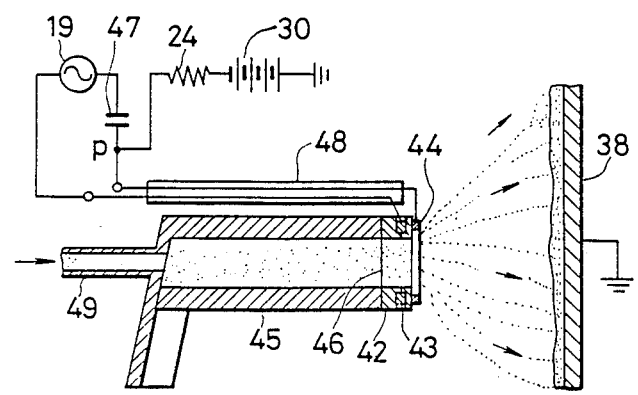
Figure 13A:
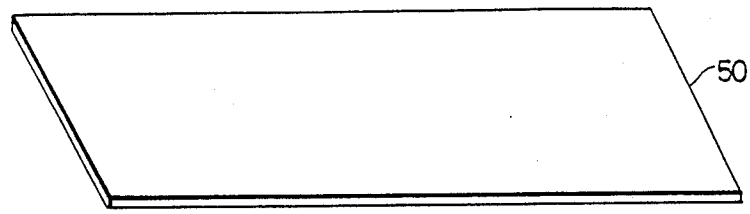
Figure 13B:
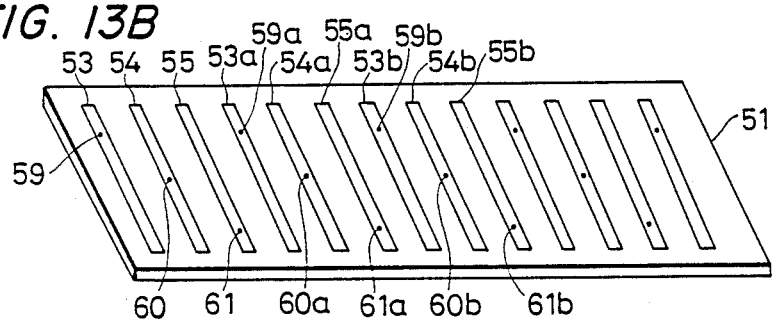
Figure 13C:
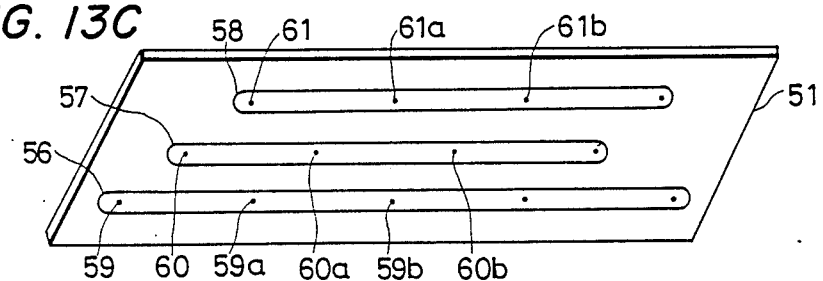
Figure 13D:
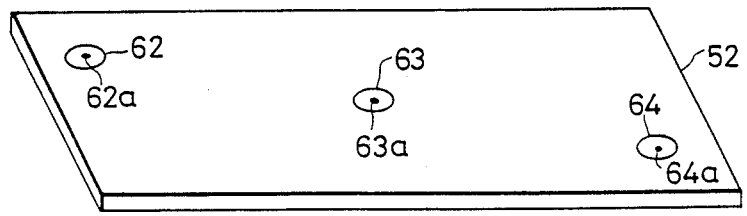
Figure 13E:
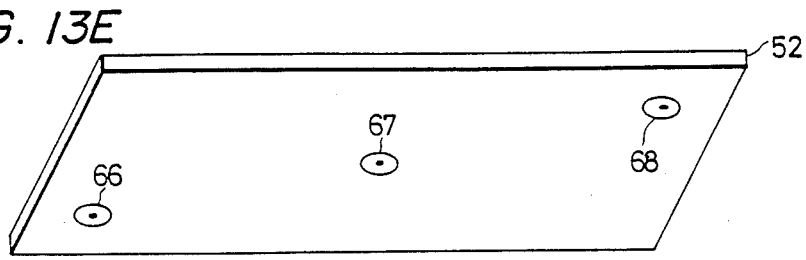
Figure 14:
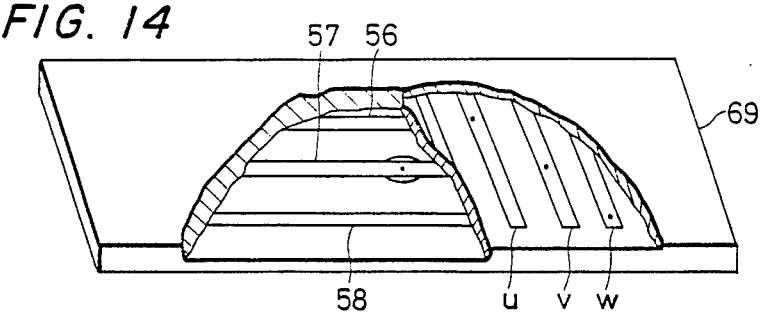
Figure 16:
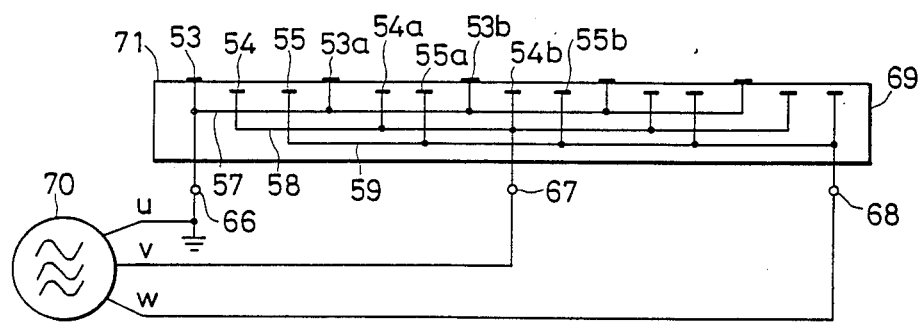
Figure 17A:
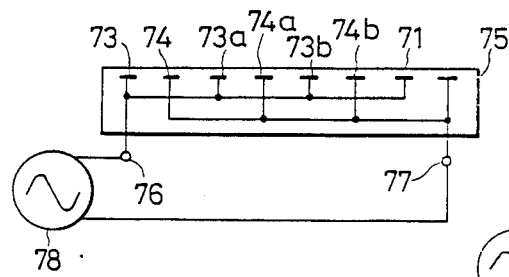
Figure 17B:
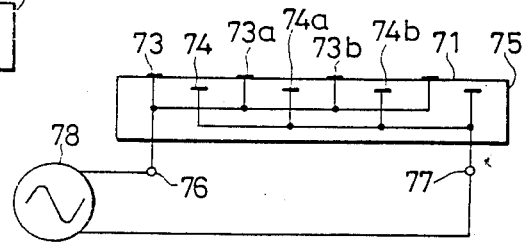
Figure 18:
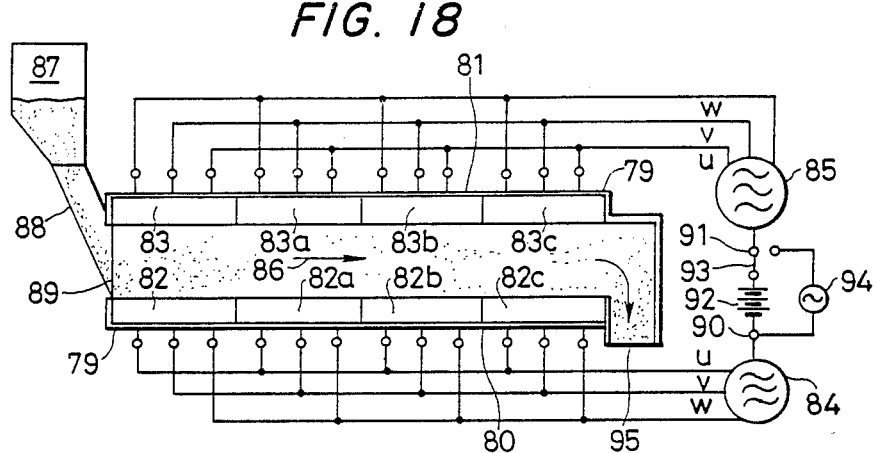
Figure 19:
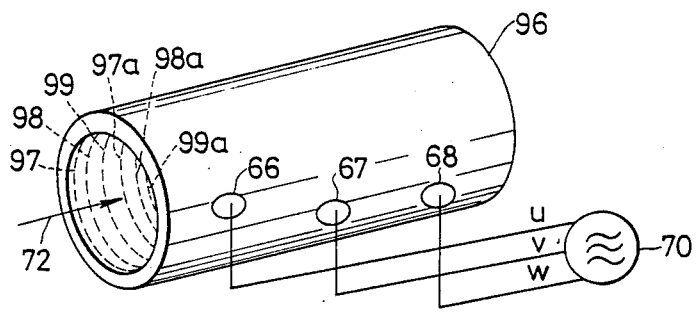
Figure 20:
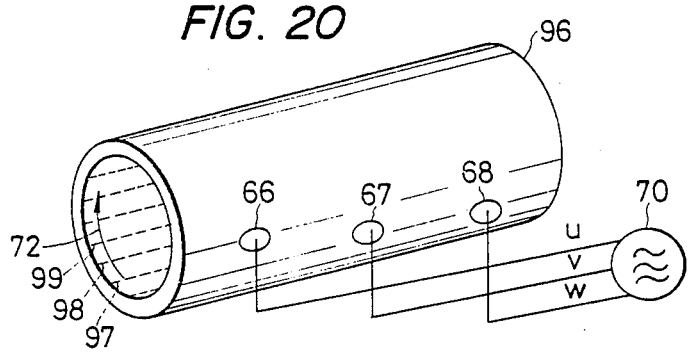
Figure 21:
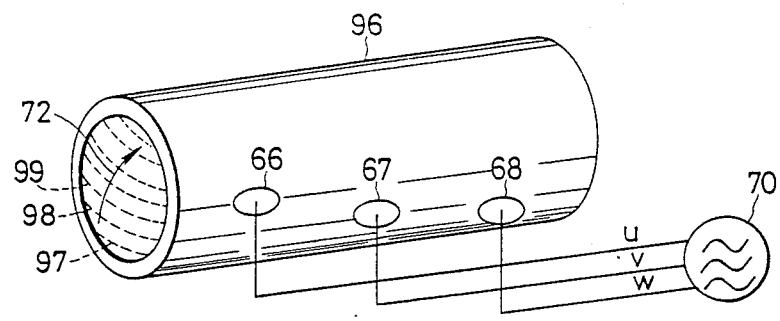
Figure 22:
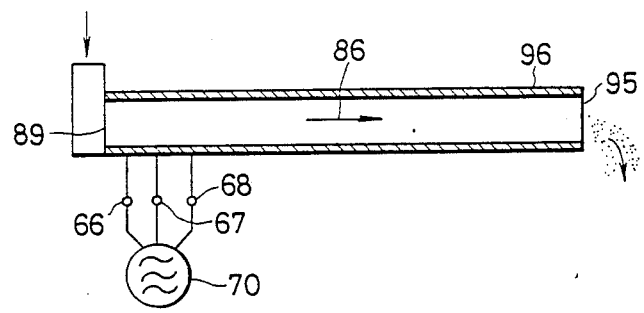
Figure 23:
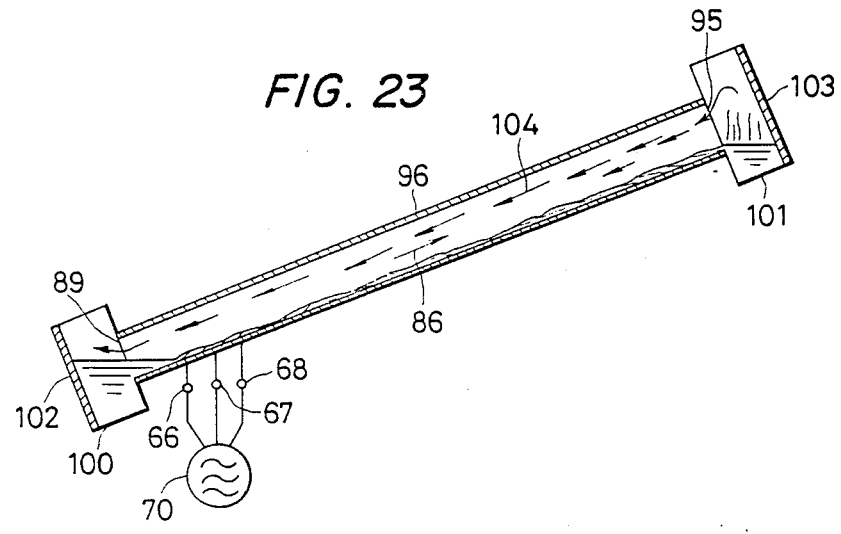
Figure 24:
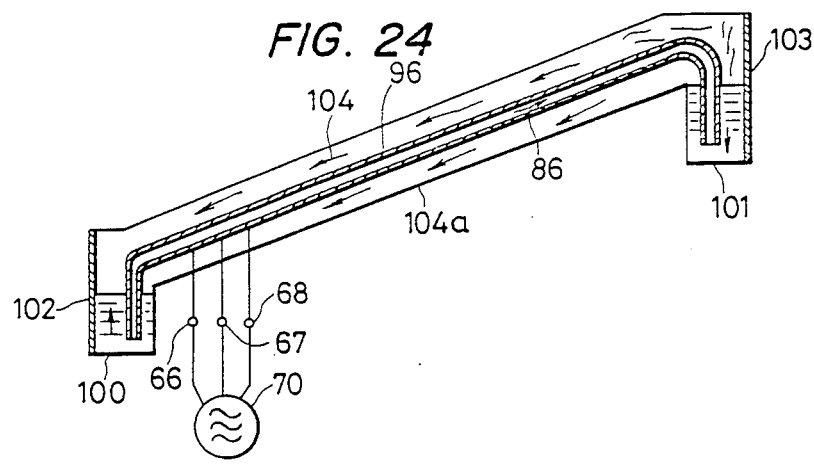
Figure 25:
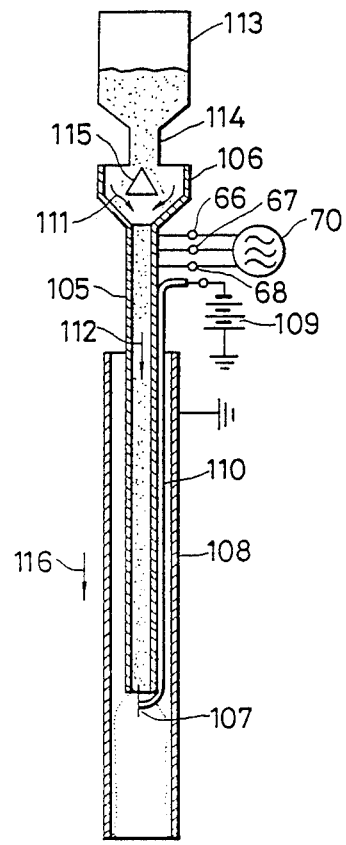
Figure 26:
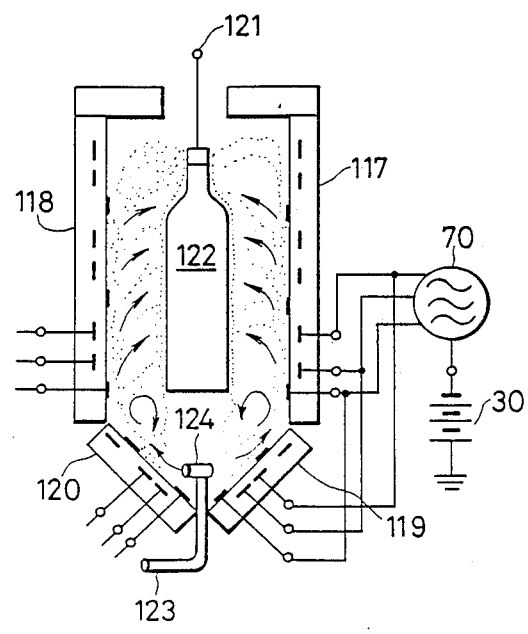
Figure 27:
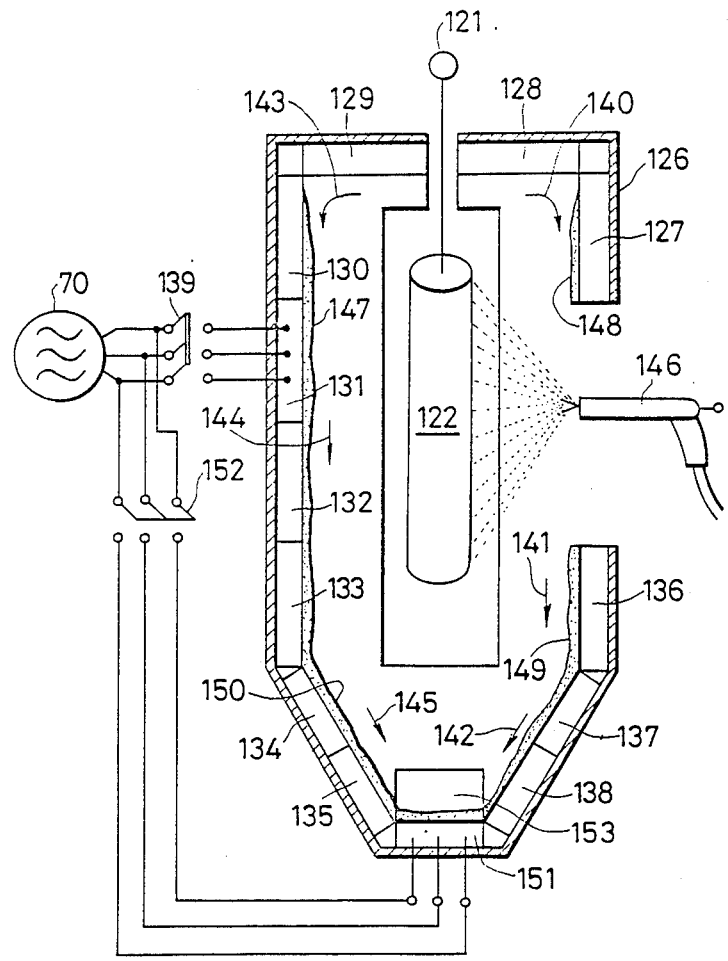
Figure 28:
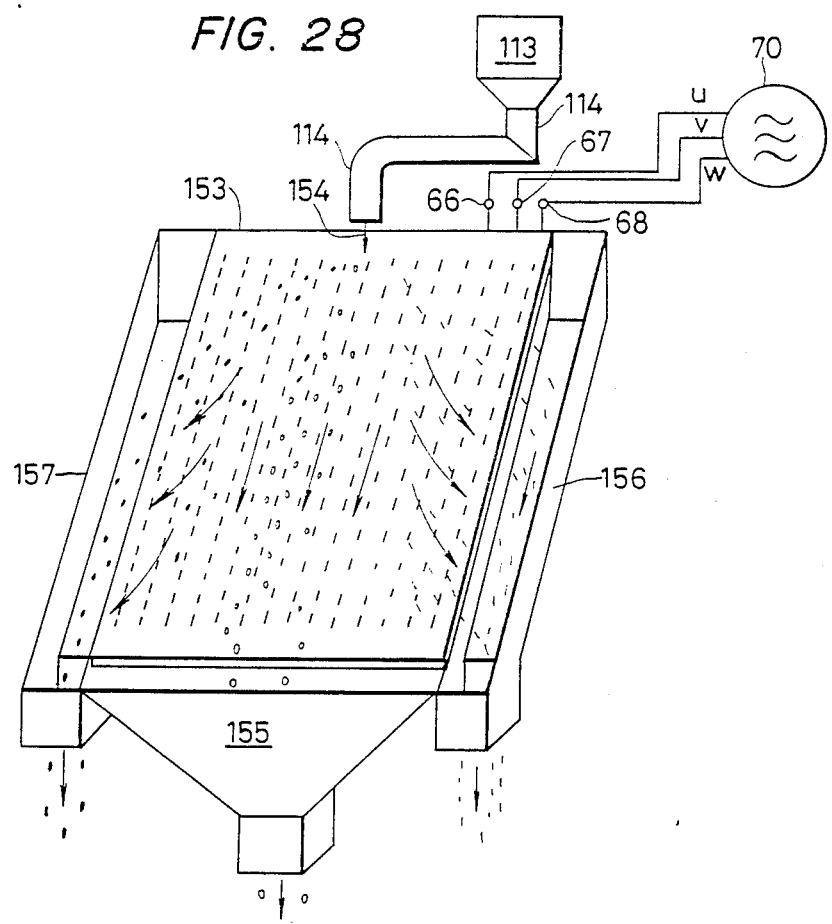

The above-mentioned and other objects, features and advantages of the present invention will be better understood by reference to the following description of preferred embodiments of the invention taken in conjunction with the accompanying drawings, wherein:

FIG. 1A is a perspective view showing a top surface of one raw material sheet in a making process of the electric field device according to the present invention, FIG. 1B is a perspective view showing a bottom surface of the same raw material sheet, FIG. 1C is a perspective view showing a top surface of the other raw material sheet, FIG. 1D is a perspective view showing a bottom surface of the other raw material sheet, FIG. 1E is a perspective view showing the state where the raw material sheets in FIGS. 1A and 1C are superposed and partly cut away, FIG. 1F is a transverse cross-section view of the structure shown in FIG. 1E, FIG. 2 is a cross-section view of one preferred embodiment of an electrostatic treatment apparatus of object matters according to the present invention, FIG. 3 to 6, 7A and 7B, respectively, are perspective views showing other prepared embodiments of the present invention, FIG. 8 is a perspective view of a charging treatment apparatus for powder material according to one preferred embodiment of the present invention, FIGS. 9 to 12 are perspective views and cross-section views of treatment apparatuses for powder material according to preferred embodiments of the present invention, FIG. 13A is a perspective view of a top surface of a surface layer green sheet in the process for making an electric field device according to another preferred embodiment of the present invention, FIG. 13B is a perspective view of a top surface of an intermediate layer green sheet for making the same device, FIG. 13C is a perspective view of a bottom surface of the same intermediate layer green sheet, FIG. 13D is a perspective view of a top surface of a base layer green sheet for making the same device, FIG. 13E is a perspective view of a bottom surface of the same base layer green sheet, FIG. 14 is a perspective view showing the state where the respective layer green sheets were superposed, pressbonded and then sintered together, FIGS. 15, 16, 17A and 17B are circuit diagrams for an electric field device according to the present invention, FIG. 18 is a cross-section view of a conveyor machine for powder material embodying the present invention, FIGS. 19, 20 and 21 are perspective views of various kinds of treatment apparatus for powder material or the like embodying the present invention, FIG. 22 is a cross-section view of a liquid conveyor apparatus embodying the present invention, FIGS. 23 and 24 are cross-section views of heat pipes embodying the present invention, FIGS. 25, 26 and 27 are cross-section views of powder painting apparatuses embodying the present invention, "FIG. 28 is a perspective view of an electro-mechanical sortor as an example of this invention."

Figure 29:
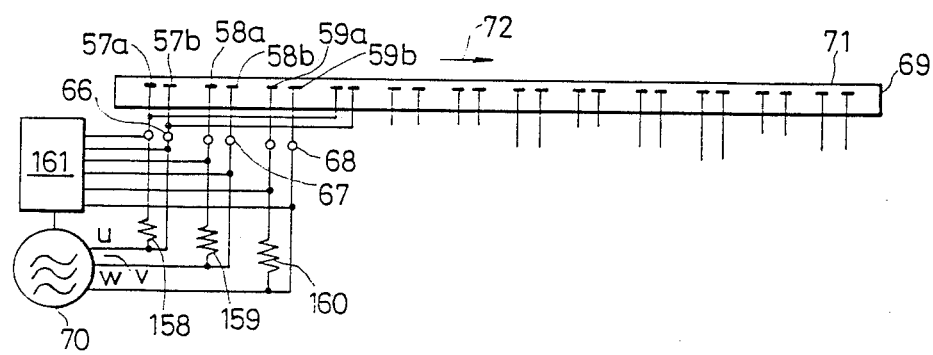
Figure 30:
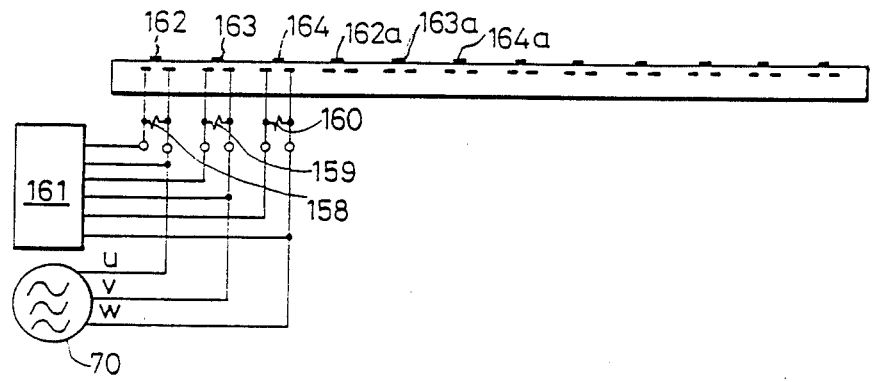
Figure 31:
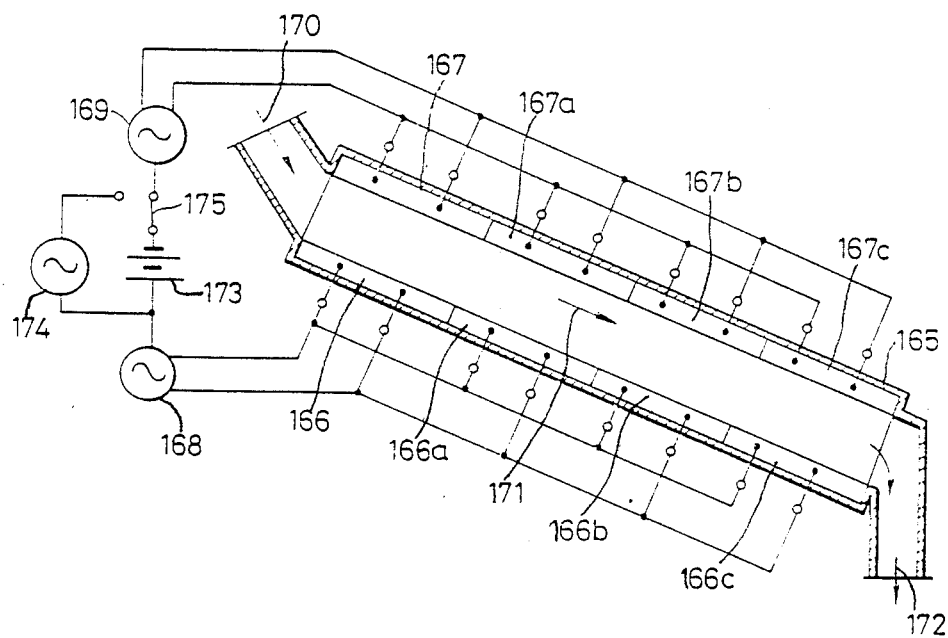
Figure 36:
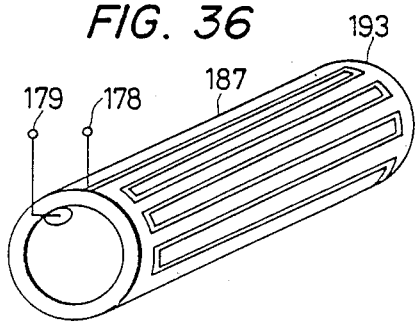
Figure 37:
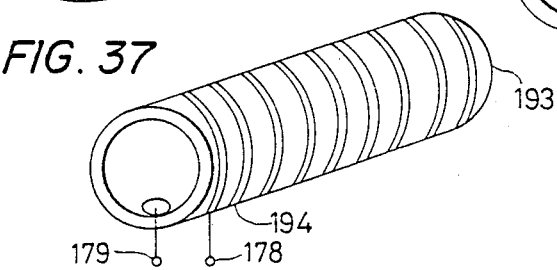
Figure 38:
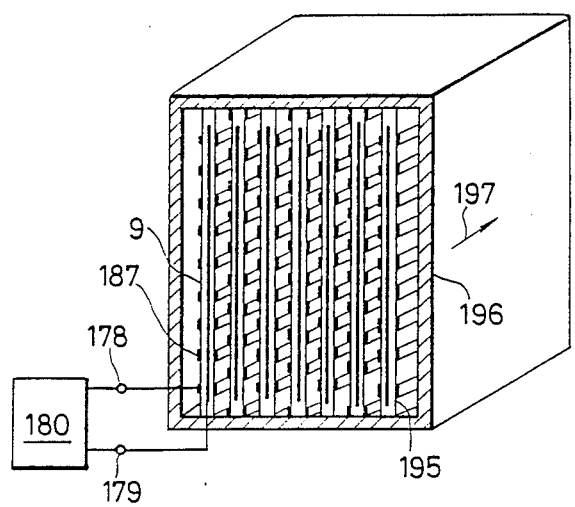
Figure 39:
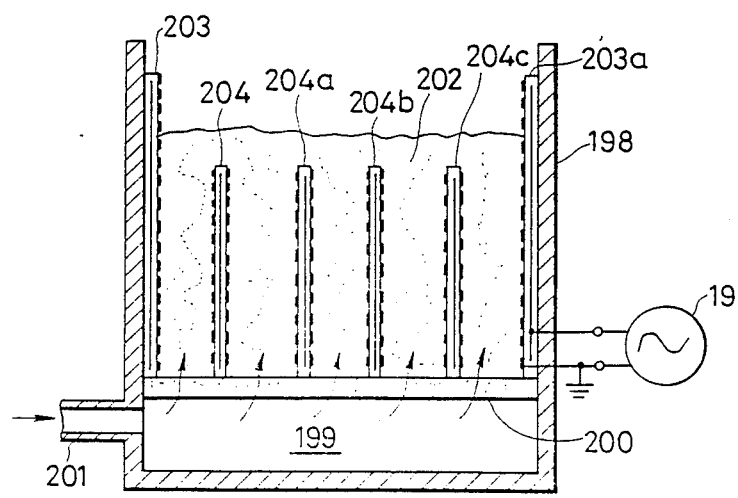
Figure 40:
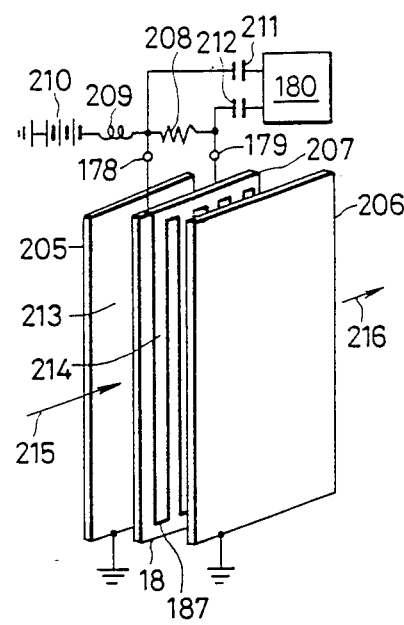
Figure 41:
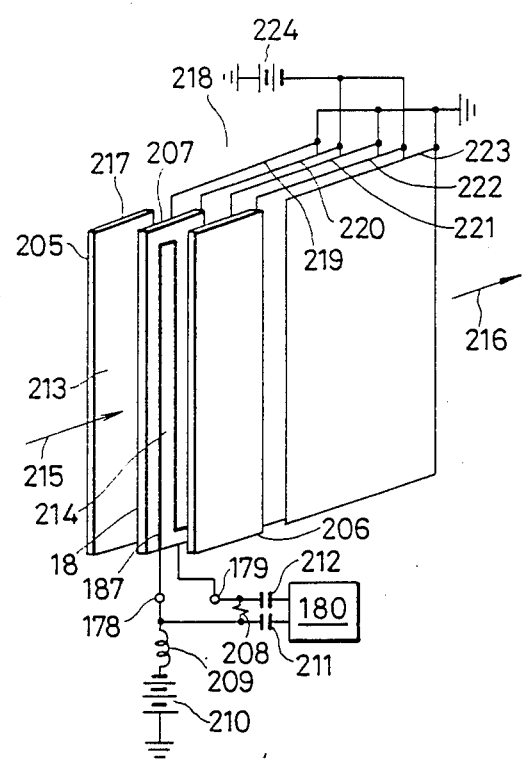
Figure 42A:
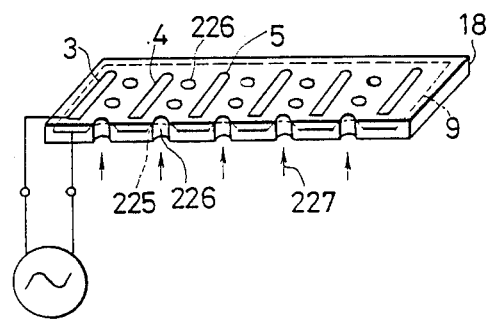
Figure 42B:
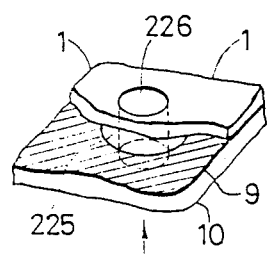
Figure 43:
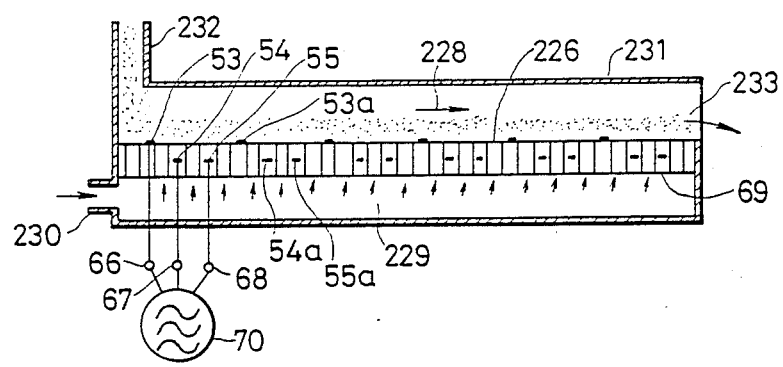
Figure 44:
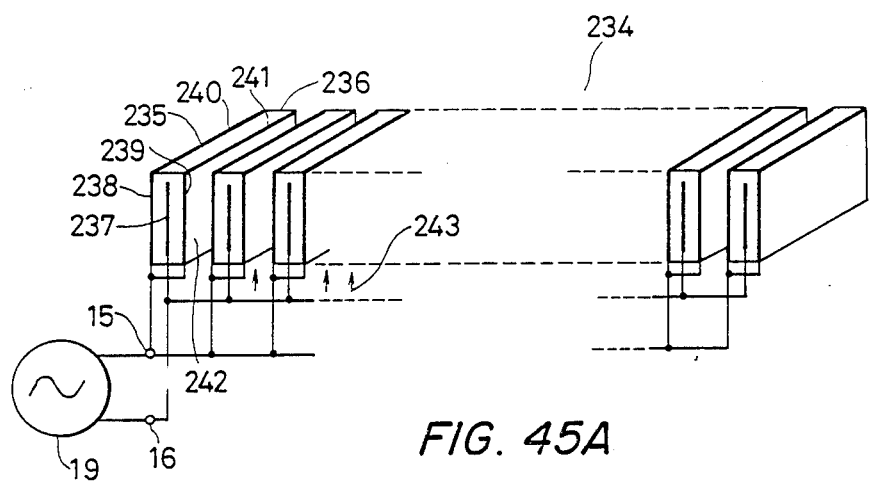
Figure 45A:
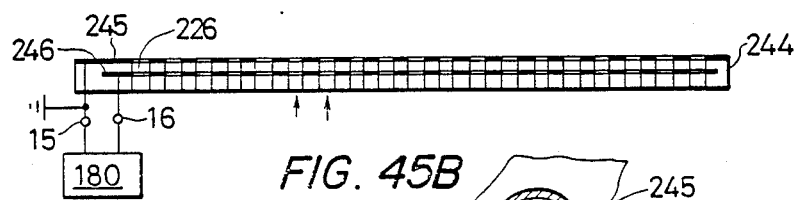
Figure 45B:
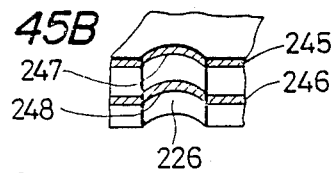
Figure 46:
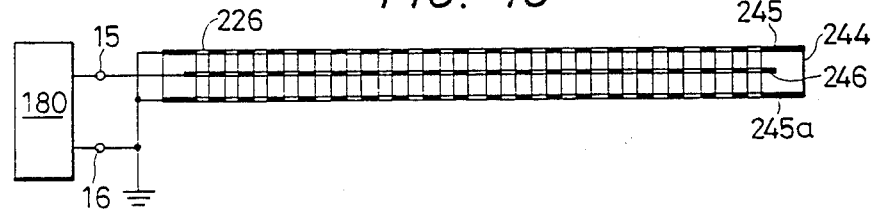
Figure 47:
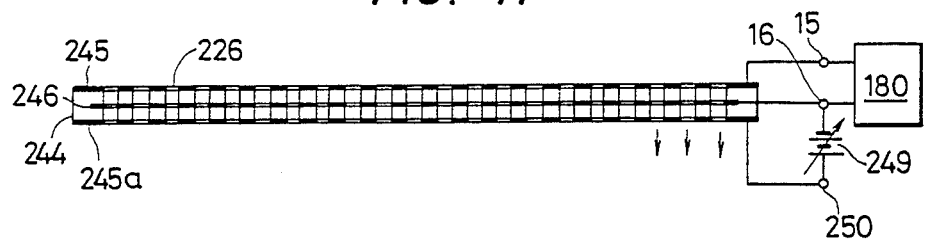
Figure 48:
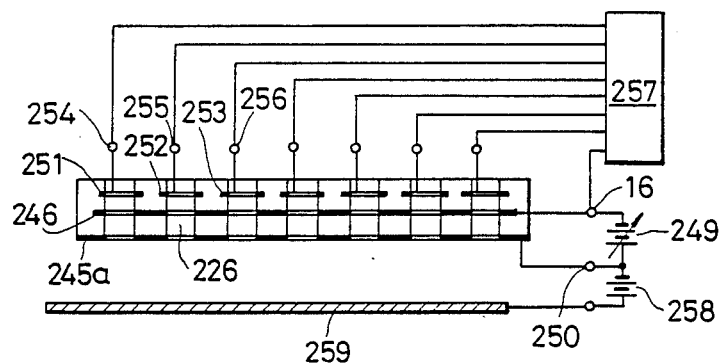
Figure 49:
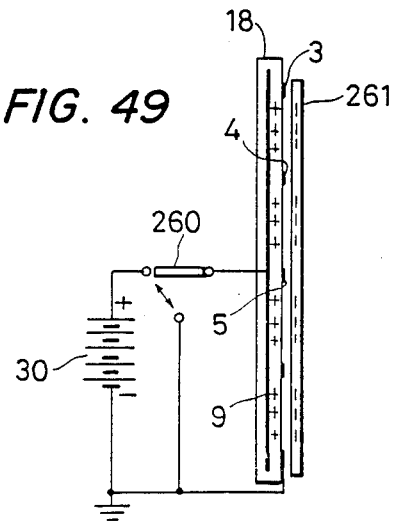
Figure 50:
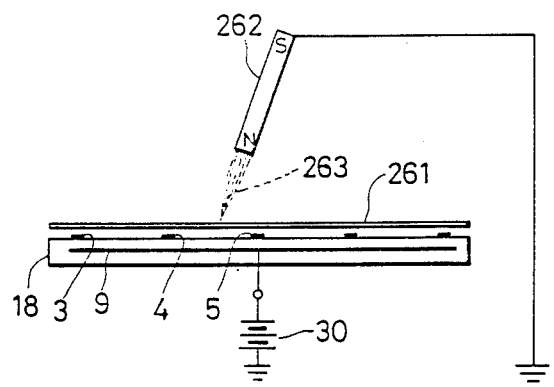
Figure 51:
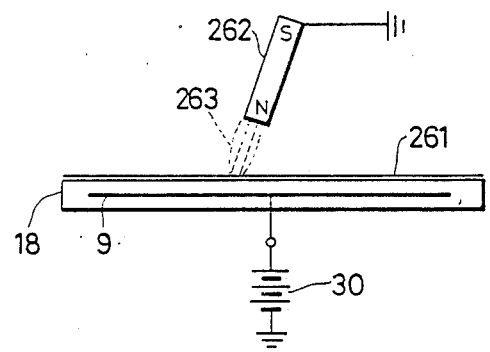
Figure 52:
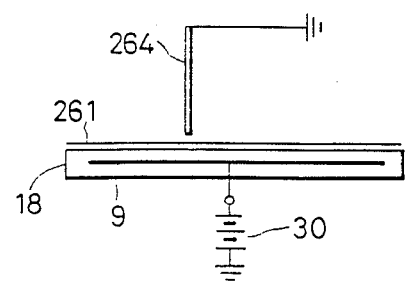

FIGS. 29, 30 and 31 are cross-section views of powder conveyor apparatuses according to preferred embodiments of the present invention, FIGS. 32 to 37 are perspective views of various types of electric field devices to be used in an apparatus according to the present invention, FIG. 38 is a perspective view of an exhaust gas treatment apparatus according to one preferred embodiment of the present invention, FIG. 39 is a cross-section view of a casing for a fluid layer according to one preferred embodiment of the present invention, FIGS. 40 and 41 are perspective views of essential parts of duct collecting apparatuses according to preferred embodiments of the present invention, FIG. 42A is a perspective view of an electric field device to be used in an apparatus according to the present invention, FIG. 42B is an enlarged view of a part of the electric field device in FIG. 42A, FIG. 43 is a cross-section view of an air slide in which an apparatus according to the present invention is incorporated, FIG. 44 is a perspective view of an apparatus incorporating modified devices of the electric field device shown in FIG. 42, FIG. 45A is a cross-section view of an electric field device to be used in an electrostatic treatment apparatus according to the present invention, FIG. 45B is an enlarged view of a part of the electric field device shown in FIG. 45A, FIG. 46 is a cross-section view of another electric field device to be used in an electrostatic treatment apparatus according to the present invention, FIG. 47 is a cross-section view of an apparatus for supplying electric charge to a surface of a photo-sensitive material of an electronic photography incorporating an electrostatic treatment apparatus according to the present invention, FIG. 48 is a cross-section view of an apparatus for supplying monopolar ions of predetermined polarity to a target, which is one preferred embodiment of an electrostatic treatment apparatus according to the present invention, FIG. 49 is a cross-section view of an electrostatic chuck incorporating an electrostatic treatment apparatus according to the present invention, and FIGS. 50, 51 and 52 are cross-section views of apparatuses for making colored toner to be adsorbed on a sheet base material.

FIGS. 1A to 1F show one preferred embodiment of an electric field device according to the present invention that is operable as an ion source. These figures show a method for making an electric field device, in which a group of elongated corona discharge electrodes are disposed on a rectangular fine ceramic dielectric plate in its lengthwise direction, a sheet of induction electrode having a size opposed to the whole of said corona discharge electrode group is embedded within the dielectric plate under the corona discharge electrode group, and then the entire assembly is sintered according to the present invention FIG. 1A is a perspective view showing a top surface of an upper green sheet, in which on an upper surface 2 of the rectangular upper green sheet 1 are formed a plurality of parallel corona electrodes 3, 4 and 5 directed in the lengthwise direction of about 1 mm in width and about 100 μm in thickness at an interval of about 5 mm with ink having tungsten micro-fine powder dispersed therein through a screen printing technique, further these electrodes are connected to a common conductor 6 printed through a similar method, and then a terminal conductor 7 is further connected by printing.

FIG. 1B is a perspective view showing a lower surface 8 of the above-described upper green sheet 1, in which a rectangular planar induction electrode 9 is formed on the lower surface portion opposed to the entire area of the upper surface occupied by the electrodes 3, 4 and 5 by printing with ink having tungsten micro-fine powder dispersed therein through a similar screen printing technique. FIG. 1C is a perspective view showing an upper surface 11 of a lower sheet 10, in which a hole 12 of about 1 mm in diameter is opened at the center of the same sheet 10 penetrating therethrough, this hole is filled with ink having tungsten micro-fine powder dispersed therein to form a conductor penetrating through the sheet 10, and further a disc-shaped contacting conductor portion 13 of about 10 mm in diameter with the hole 12 located at its center, is formed by screen printing similarly with ink having tungsten micro-fine powder dispersed therein In addition, through a similar method, on the left and edge of the sheet 10 is depicted a terminal conductor 7a to be connected with the terminal conductor 7. FIG. 1D is a perspective view showing a lower surface 14 of the lower sheet 10, in which a disc-shaped terminal conductor portion 15 of about 10 mm in diameter with the aforementioned hole 12 filled with ink having tungsten micro-fine powder dispersed therein located at its center, is formed by screen printing similarly with ink having tungsten micro-fine powder dispersed therein. In addition, at the left end of the lower surface 14 is formed another disc-shaped terminal conductor portion 16 of about 10 mm in diameter by screen printing similarly with ink having tungsten micro-fine powder dispersed therein, and this terminal conductor portion 16 is connected to the terminal conductor 7a through a terminal conductor 17 printed with similar ink. Subsequently, aforementioned respective sheets 1 and 10 are superposed, and after they have been shaped by hot press bonding, they are sintered within a hydrogen furnace Then they are sintered with the planar induction electrode 9 airtightly sandwiched between the respective sheets 1 and 10, and the electrode 9 can be embedded within a dielectric plate 18 which has been integrally sintered from the upper and lower sheets. And the aforementioned induction electrode 9 is fused jointly with the disc-shaped terminal conductor portion 13 and is connected to the disc-shaped terminal conductor portion 15 on the rear surface of the dielectric plate 18 as conducting through the hole 12. On the other hand, the group of corona electrodes 3, 4 and 5 on the front surface of the dielectric plate 18 are connected through the common conductor 6 and the terminal conductors 7 and 7a to the disc-shaped terminal conductor portion 16 on the rear surface of the dielectric plate 18. FIG. 1E is a perspective view showing electrode surfaces of an electric field device serving as an ion source which was fabricated in the above-described manner, in which a ceramic plate portion made of the upper green sheet is partly cut away to show a ceramic plate portion made of the lower green sheet and the induction electrode 9. FIG. 1F shows a cross-section view of this electric field device. It is to be noted that the surfaces of the electrodes 3, 4 and 5, the conductors 6, 7, 7a and 17 and the terminal conductor portions 15 and 16 are plated by nickel in order to prevent oxidation of tungsten, and thereby soldering of external conductors to the terminal conductor portions 15 and 16 is facilitated If a high frequency A.C. high voltage is applied from a high frequency A.C. high voltage source 19 via the terminal conductor portions 15 and 16 not shown between the corona electrode group 3, 4 and 5 and the planar induction electrode 9 by the intermediary of the fine ceramic dielectric layer 20 (the electrodes 3, 4 and 5 being grounded for the purpose of safety), then high frequency corona discharge is generated from the edges of the electrodes 3, 4 and 5 along the surface of the dielectric plate 18, and thereby plasma containing plenty of positive and negative ions is formed. Accordingly, if this device is brought close to a proximity of a charged body, ions of the opposite polarity to that charge are supplied from this plasma to the aforementioned charged body, and thereby the charged body can be quickly discharged. In order words, the device can be used as a discharger or a charge remover In this case, as a matter of course, repetitive pulse voltages could be applied by employing a pulsed high voltage source in place of the high frequency A.C. high voltage source 19.

FIG. 2 shows one example in which the ion source electric field device 21 in FIG. 1F is utilized to remove electric charge charged by friction on a rubber belt 23 after passing around a roller 22, in which the ion source electric field device 21 is disposed in the close proximity of a charged rubber belt surface, and in the illustrated example, negative ions are attracted from the plasma formed by the corona electrode group 3, 4 and 5 to neutralize the positive charge on the rubber belt surface. Reference numeral 24 designates a protective resistor.

Figure 3:
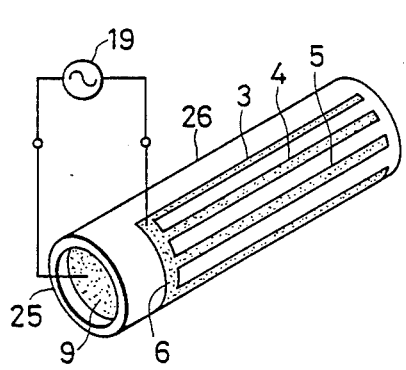

FIG. 3 shows a ion source constructed by bending the upper sheet 1 shown in FIGS. 1A and 1B about an axis directed in the lengthwise direction of the sheet so that the upper surface of the green sheet 1 may come outside to form a hollow cylinder 25, and then sintering the hollow cylinder-shaped green sheet. When a high frequency A.C. high voltage source 19 is connected to the thin wire-shaped corona discharge electrodes 3, 4 and 5 which are arrayed on the outer cylindre surface in the lengthwise direction in parallel to each other and at equal intervals and the induction electrode 9 formed in a cylindrical surface shape on the inner cylindre surface as shown in FIG. 3 and then a high frequency A.C. high voltage is applied between the respective electrodes by the intermediary of the cylindrical dielectric body 25 made of fine ceramic, high frequency corona discharge is generated from the thin wire-shaped corona discharge electrodes along the outer surface of the aforementioned cylindrical dielectric body, and thereby plasma is produced Accordingly, an electric field device 26 serving as a cylindrical plasma ion source can be constructed.

Figure 4:
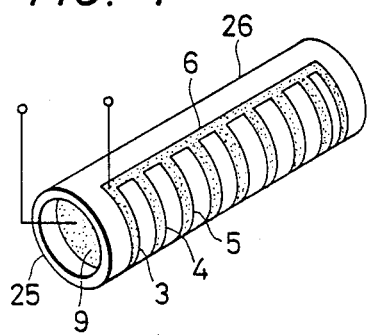

In this case, it is a matter of course that as one modification of the structure shown in FIG. 3, the thin wire-shaped corona discharge electrodes 3, 4 and 5 could be disposed on the cylinder surface so as to be perpendicular to generating lines. FIG. 4 shows such modification.

Figure 5:
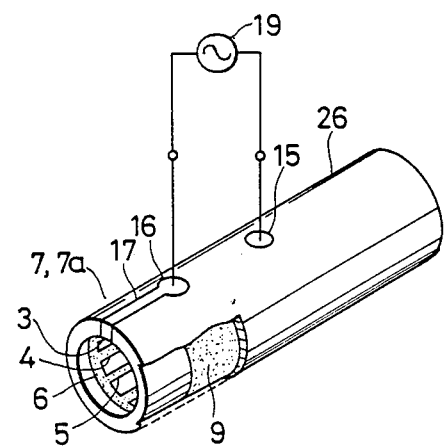

FIG. 5 shows an ion source constructed by superposing the upper sheet shown in FIGS. 1A and 1B and the lower sheet shown in FIGS. 1C and 1D with each other, stacking and press-bonding them into the shape shown in FIG. 1E, thereafter bending the assembly about an axis directed in the lengthwise direction of the sheets so that the upper surface having the thin wire-shaped corona discharge electrodes 3, 4, 5, ... may come inside to form a hollow cylinder 26, and then sintering the hollow cylinder-shaped green sheet. If a high frequency A.C. high voltage is applied between the thin wire-shaped corona discharge electrodes, 3, 4, 5, . . . airayed on the inner cyclinder surface as directed in the axial direction in parallel to each other and at equal intervals and the induction electrode 9 embedded within the fine ceramic hollow cylinder 26 and formed in a cylindrical surface shape via the terminal conductor portions 15 and 16, respectively, as shown in FIG. 5, then high frequency corona discharge is generated from the corona discharge electrode group 3, 4, 5, .... along the inner surface of the hollow cylinder 26, and thereby a plasma ion source can be formed Accordingly, when such a hollow cylindrical electric field device is interposed in the midway of a pneumatic conveyor pipe line for pulverized or granular material having a high electric resistance, electricity on the pulverized or granular material which has been strongly charged by friction with the inner wall surface of the pipe line, can be neutralized and removed by ions having the opposite polarity supplied from the plasma produced on the inner surface of the aforementioned hollow cylinder 26.

FIG. 6 shows one modification of the device shown in FIG. 5, in which thin wire-shaped corona discharge electrodes 3, 4, 5, ... are arrayed on an inner surface of a hollow cylinder 26 in the direction perpendicular to the axis of the cylinder.

The cylinder-shaped electric field device shown in FIGS. 5 and 6 can be used for removing electric charge of a liquid which has been charged by friction with a pipe by interposing the device in the midway of a pipe line conveyor of a liquid having a high resistance.

FIG. 7A shows one example of application of electric field devices 27 each of which employs its both surfaces as ion sources by providing thin wire-shaped corona discharge electrodes 3a, 4a, 5a, ... also on the lower surface of the fine ceramic dielectric plate 18 shown in FIGS. 1E and 1F as directed in the lengthwise direction. In the illustrated example, the electric field device 27 is directly inserted and disposed within a conveyor pipe line 28 for pulverized or granular material having a high resistance or a liquid having a high resistance to remove electric charge from the pulverized or granular material or the liquid. For the same purpose, the electric field devices shown in FIG. 3 or 4 also can be used, and in that case, in place of the planar ion source electric field device 27, these cylindrical ion source electric field devices are disposed in the proximity of the center axis of the conveyor pipe line 28 along the center axis.

FIG. 7B shows another example of application of the electric field devices, in which a large number of electric field devices 18, 18a, 18b, 18c, ..... servicing as ion sources as illustrated in FIGS. 1E and 1F are disposed on an inner wall surface of a conveyor pipe line 28 for pulverized or granular material or a high resistance liquid so as cover a part or whole of the inner wall surface, and electric charge is removed from the aforementioned pulverized or granular material or high resistance liquid which has been charged by friction with the pipeline on the upstream side by means of the plasma produced by the electric field devices.

FIG. 8 shows one example in which the planar ion source electric field device 18 shown in FIGS. 1E and 1F is used as a charging apparatus, in which the electric field device 18 is insulatively supported in opposition to a grounded non-corona electrode 29 so that the corona discharge electrodes 3, 4, 5, ... may be opposed to the non-corona electrode 29, and after a plasma has been produced from the corona electrodes 3, 4, 5, ... by applying a high frequency high voltage from a high frequency A.C. high voltage source 19 between the corona discharge electrodes 3, 4, 5, ... and the embedded induction electrode 9, if the corona discharge electrodes 3, 4, 5, ... are connected to a negative D.C. high voltage source 30, then negative ions would travel from the plasma towards the grounded non-corona electrode 29, and thereby a D.C. electric field and an ion current are produced in a charging space 31 between the electric field device 18 and the non-corona electrode 29. At this moment, if an object matter intended to be charged, for instance, pulverized or granular material or a liquid drop 32 is introduced into this charging space 31, then it is subjected to bombardment by negative ions, thus negatively charged at once, and supplied to the exterior as a charged object 33.

Figure 9:
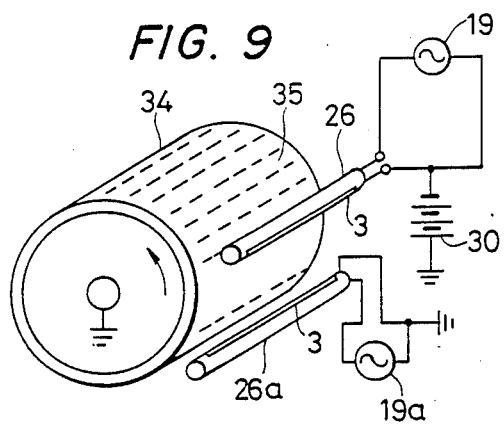

FIG. 9 shows one example by application of the electric field device, in which negative ions are given to a surface of a grounded photo-sensitive roller 34 having a photoconductive coating film on its surface, which is used in an electronic photography, by making use of the cylinder-shaped ion source electric field devices 26 shown in FIG. 3 or 4. Since these ion sources can produce quite plenty of negative ions uniformly, they can put negative ions on a photoconductive film 35 on the surface of the roller 34 uniformly within a short period of time. In this figure, reference numeral 19 designates a high frequency A.C. high voltage source, numeral 30 designates a negative D.C. high voltage source, and since the effects of these voltage sources are self-explanatory, there is no need to add special explanation thereon. Reference numeral 26a in FIG. 9 is a similar cylindrical ion source electric field device, in which corona discharge electrodes 3, 4, 5, ... are grounded, so that positive ions supplied from plasma formed by this electric field device can remove remaining negative ions on the roller 34. Reference numeral 19a also designates a high frequency A.C. high voltage source.

Figure 10:
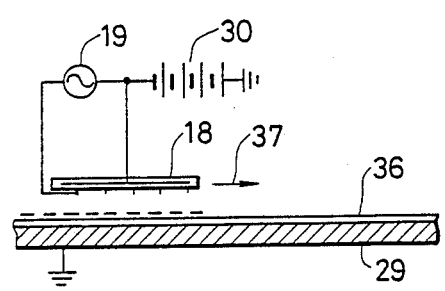

FIG. 10 shows one example of application of electric field device according to this invention wherein a charging ion source electric field device 18 is employed for giving negative charge to a surface of insulating film 36 disposed on a grounded non-corona electrode 29, thereby the film 36 is intensely adhered to said non-corona electrode 29 due to electric force. The electric field device 18 is moved in the direction of arrow 37. Thus, the entire surface of film 36 can be charged uniformly. When the D.C. high voltage source 30 is disconnected and the connecting terminal is grounded, the electric field device 18 acts as discharger which removes the surface charges of film 36 and enables said film 36 to be detached from said non-corona electrode 29.

FIG. 11 illustrates an example of employing a charging ion source electric field device 18, as shown by FIG. 8, in a powder painting apparatus. The charging ion source electric field device 18 is disposed to confront a suspended, grounded substrate 38. Upon forming a plasma round corona discharge electrodes 3, 4, 5 ... on the confronting surface of electric field device 18 by means of an A.C. high voltage source 19, a D.C. high voltage source 30 is used to run negative ions from said plasma toward said substrate 38. A powder is concurrently fed from above to the surface of, electric field device 18 by way of a pipe line 39 and a slit 41 of triangular—formed feeder 18. Thereupon, said powder is negatively charged due to bombardment by negative ions and is carried by electric force toward the substrate 38 to coat a surface thereof.

FIG. 12 shows an example of application in which an annular ion source electric field device 42 is composed of fine ceramic dielectric in accordance with this invention and a powder painting apparatus is constructed by mounting the formed device 42 on the forward end of a hand gun for powder painting In FIG. 12, the device 42 is shaped as an annular fine ceramic dielectric body with the longitudinal section of rectangle. Said device 42 has been made so as to have an annular induction electrode 43 embedded therein and an annular thick film-shaped corona discharge electrode 44 of tungsten at the front thereof, according to the producing methods as illustrated by FIGS. 1A to 1F in detail. Thus-formed fine ceramic body is aligned with an annular opening 46 and attached to the front end of a hand gun 45 made of plastic. When a high frequency A.C. high voltage from a high frequency A.C. high voltage source 19 is applied between induction electrode 43 and corona discharge electrode 44 by way of a protective condenser 47 and a cable 48, the annular corona discharge electrode 44 generates a plasma along the front surface of annular fine ceramic dielectric body Further, a negative D.C. high voltage from a negative D.C. high voltage source 30 is applied to the point P, as shown in FIG. 12, by way of a protective high resistance 24. Then, negative ions run from said plasma toward the grounded substrate 38 disposed forward and a D.C. electric field appears between corona discharge electrode 44 and substrate 38. Accordingly, when a powder dispersed in air from a pipe 49 is fed to the rear end of hand gun 45, the powder which passed from end opening 46 through fine ceramic dielectric body 42 is negatively charged by bombardment of negative ions mentioned above in the course of spouting to the right. The charged powder is driven by the action of electric field to the surface of substrate 38 and adheres thereto. As the intensity of ion current can be freely controlled by changing the high frequency A.C. voltage to be applied, it becomes feasible to obtain a good painting efficiency.

FIGS. 13A to 13E illustrate one embodiment of the electric field device according to this invention. This embodiment corresponds to "three-phase contact type electric field curtain device" as the most typical electric field device for electromechanical operation apparatus. In this embodiment are employed three green sheets 50, 51, 52 as three layers FIG. 13A is a perspective view of very thin surface layer green sheet 50 having a thickness of about 0.1–0.5 mm when viewed from above sideways. This sheet has no printed electrode. FIG. 13B is a perspective view of the upper surface of rectangular intermediate layer sheet 51 having a thickness of about 2 mm. On the upper surface, many parallel narrow strip electrodes 53, 54, 55, 53a, 54a, 55a, 53b, 54b, 55b, ... are disposed by screen printing technique with tungsten micro-fine powder dispersion ink. They are of about 1 mm in width and about 0.1 mm in thickness, and are arranged at right angles to the longitudinal direction if the sheet 51 with equal intervals of about 5 mm. Every third electrode of them is connected to one another to form three electrode groups u, v and w, consisting of electrodes, 53–53a–53b ..., 54–54a–54b and 55–55a–55b ..., respectively. The u, v and w phase voltages of a three—phase A.C. high voltage will be applied to respective electrode groups. To this end, three connecting conductors 56, 57 and 58 parallel to lengthwise direction of sheet are screen printed on the back surface of intermediate layer sheet 51 in the same manner, and the conductor 56 is connected to u-phase group of electrodes 53, 53a, 53b ... on the upper surface of intermediate layer sheet 51 by way of small holes 59, 59a, 59b which penetrate through sheet 51 and are filled with tungsten micro-fine powder dispersion ink, as shown in FIG. 13C. Similarly, the conductor 57 is connected to v-phase group of electrodes 54, 54a, 54b ... on the upper surface of intermediate layer sheet 51 by way of similar small holes 60, 60a, 60b .... Further, the conductor 58 is connected to w-phase group of electrodes 55, 55a, 55b ... on the upper surface of intermediate layer sheet 51 by way of similar small holes 61, 61a, 61b .... Thus, the connecting conductors 56, 57, 58 constitute conducting means for applying u-phase, v-phase and w-phase voltages of a three-phase A.C. high voltage to u-phase group of electrodes, v-phase group of electrodes and w-phase group of electrodes, respectively. FIG. 13D is a perspective view of the upper surface of a base layer green sheet 52 of 3 mm in thickness and FIG. 13E is a perspective view of the rear surface thereof. Reference numerals 62a, 63a and 64a designate small holes which penetrate the sheet 52 and are filled with tungsten powder dispersion ink. Around said small holes, there are provided disc-shaped contacting conductor parts 62, 63, 64 of about 10 mm in diameter on the upper surface and disc-shaped terminal conductor parts 66, 67, 68 of about 10 mm in diameter on the rear surface. Each of said conductor parts has been screen printed with tungsten powder dispersion ink. The combinations 62–66, 63–67 and 64–68 are positioned so as to be connected by contact to conductors 56, 57 and 58, respectively. When these three green sheets 50, 51, 52 are superposed, press-bonded and then sintered, a three-phase contact type electric field curtain device 69, as shown by FIG. 14, is completed. In this device, there are provided three-phase electrode groups u, v and w inserted in fine ceramic matrix, beneath a smooth thin fine ceramic layer, and, under said electrodes, connecting conductors 56, 57 and 58 embedded in the same fine ceramic matrix, which are connected to u-phase, v-phase and w-phase electrode groups. When three-phase voltages from a three-phase A.C. high voltage source 70 are applied to three-phase electrode groups of this electric field curtain device 69 in the sequence u-phase, v-phase, w-phase by way of terminal conductor parts 66, 67, 68, as shown by a schematic diagram of a model in FIG. 15, a progressive wave non-uniform electric field which travels in the phase sequence direction, as shown by arrow 72, along surface 71 of device 69 is generated. Consequently, if particles of a powder are placed on the surface 71 of device 69, they are charged by contact with the surface and then violently repelled and floated from the surface due to the action of said progressive wave non-uniform electric field. They are conveyed in floating state in the direction of arrow 72. In summary, the most important electromechanical actions to a powder of this three-phase contact type electric field curtain device consist in these charging by contact, repelling and transporting. By virtue of these actions, this electric field device can be utilized for preventing the adherence and the accumulation of powder and for transporting a powder. If the value of a impressed three-phase A.C. high voltage is being increased, a kind of electrodeless A.C. corona discharge is generated above a certain critical value of voltage Vc and the air on the surface is electrically dissociated to produce positive and negative ions. In this situation, the above-mentioned electromechanical actions, such as repelling and transporting, become more vigorous.

Figure 15:
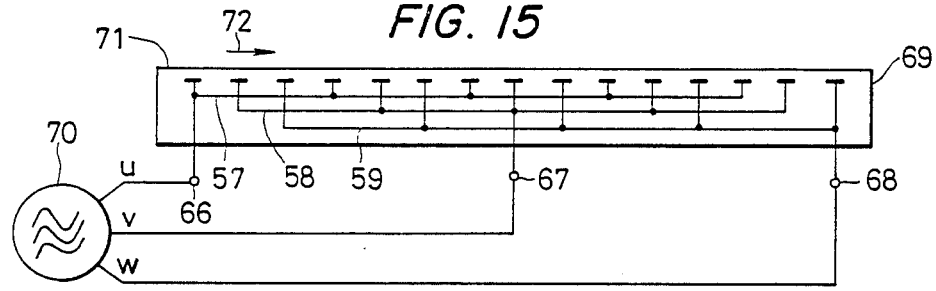

Accordingly, when only one electrode group, e.g. u-phase group consisting of electrodes 53, 53a, 53b ..., of these three-phase electrode groups of 53, 54, 55, 53a, 54a, 55a, 53b, 54b, 55b .. is arranged to expose outside (for safety, grounded), as shown by FIG. 16, a vigorous A.C. corona discharge generates around surfaces exposed to air of metal electrode group of 53, 53a, 53b ..., even if at relatively low voltage, and said repelling and transporting actions are promoted This device is referred to as one-phase-exposed type. Moreover, modifications of the device in FIG. 16, that is, devices wherein two phase electrode groups or all three phase groups are exposed are also employable. In addition, with the same three layer structure as shown by FIG. 13 can be formed a so-called single-phase contact type electric field curtain device 75 which has single-phase electrodes 73, 74, 73a, 74a ... as shown in FIG. 17A or FIG. 17B, in place of three-phase electrodes In the case when a single-phase A.C. high voltage from a single-phase A.C. high voltage source 78 is applied between the electrode group 73–73a–73b ... and the electrode group 74–74a–74b ..., each electrode member of one group being adjacent to electrode members of the other group, by way of terminal conductor parts 76 and 77, as shown by FIGS. 17A and 17B, standing wave A.C. nonuniform electric field are generated among these electrodes, and particles of powder on the surface 71 of device 75 are charged by contact and repelled violently to float Although a single-phase contact type electric field curtain device 75 has a remarkable repelling action to charged particles as mentioned above, but generally has no transporting action. The device of FIG. 17B wherein one group of phase electrodes 73, 73a ... are arranged on the surface 71 to expose to the atmosphere is of one-phase-exposed type and generates a vigorous A.C. corona discharge at a relatively low voltage to promote remarkably said repelling action, as well. As a matter of course, a single-phase contact type electric field curtain device in which all electrodes are exposed as modification of device in FIG. 17A or 17B is operable. Single-phase contact type electric field curtain devices of all these types can be employed in constructing pipe lines for transporting a pulverized or granular material and in lining inner walls of powder painting booth for sweeping off adhered particles or preventing adhesion of particles. In addition, when these single-phase contact type electric field curtain devices are disposed obliquely, particles of pulverized or granular material placed on devices are 20 subject to vigorous agitating and floating action and slide downwards along the surface of the device due to gravity. Therefore, the devices can be utilized for conveying pulverized or granular material. In the device shown in FIG. 15, changes in connection enable the use of a multi-phase A.C. source in place of three-phase A.C. source 70. In the device shown by FIG. 16 also, a multi-phase A.C. source can be used. In such a case, electrodes to be exposed should be exchanged depending on change in phases. In place of using a surface layer sheet 50, a thin insulating alumina layer which has been formed by applying a finely divided alumina dispersion ink onto an intermediate layer sheet by screen printing and then have been sintered can be employed. In accordance with this technique, the surface layer 50 can be made especially thin.

FIG. 18 shows an example of application wherein three-phase contact type electric field curtain device as one of electric devices of this invention is utilized to compose a conveyor machine for pulverized or granular material. An underside surface 80 and an upside surface 81 of inner wall of a flume 79 having rectangular horizontal section are paved with a number of plate form three-phase contact type electric field curtain devices 82, 82a, 82b ... and 83, 83a, 83b ... which have been shown in FIG. 15 or 16. Three-phase A.C. high voltages from three-phase A.C. high voltage sources 84, 85 are applied to the respective group of devices and progressive wave non-uniform electric fields which travel in the phase sequence direction as shown by arrow 86 are generated. Accordingly, when a powder from a hopper 87 is fed to the left end 89 of a flume 79 through a chute 88, the powder first contacts with the surface of three-phase contact type electric field curtain device 82, is charged by contact, floats under the action of said progressive wave non-uniform electric field, and is conveyed in the direction of arrow 86. By virtue of providing upside surface 81 of inner wall of flume with three-phase contact type electric field curtain devices 83, 83a ..., to say nothing of underside surface 80, progressive wave non-uniform electric fields are generated along both underside and upside surfaces Thus, the electric field strength is multiplied throughout the entire space between both surfaces to enhance widely the conveying effect In addition, when a D.C. high voltage source 92 is connected between neutral points 90, 91 (for example, neutral point of secondary winding or star-connected boosting transformer) of three-phase A.C. high voltage sources 84, 85 to generate a vertical D.C. field in the flume, the floating effect is usually enhanced and, as a result, the transporting capacity increases. A single-phase A.C. high voltage source 94 is connected between neutral points 90, 91 in place of D.C. high voltage source 92 by changing over a switch 93 to the right hand, as the case may be. Similar effects are obtained. In such a conveyor, when the A.C. voltages of three-phase A.C. high voltage source 84, 85 is raised above corona initiation voltage Vc, A.C. corona discharges are generated on the surfaces of three-phase contact type electric field curtain devices 82, 82a ... and 83, 83a ... and plasma appears as mentioned above If the powder has inherently an excessive surface charge and tends to coagulate of itself, such a powder is momentarily discharged under the action of plasma generated in said conveyor during being conveyed Thus, the powder collected from the right hand end 95 of flume is free-flowing and can be handled with ease. Such a surface modification of powder by plasma is referred to as passivation. The electric field devices according to this invention shown in FIGS. 15, 16, 17 and 18 and FIGS. 19, 20 and 21 to be explained hereinafter can be utilized for passivation operation of powder.

In the case of the conveyor machine shown by FIG. 18, the most important are underside electric devices 82, 82a ... and, in many cases, mere underside devices permit the machine to show a satisfactory conveying performance. Thus, upside electric field devices 83, 83a ... and the electric sources 85, 92 can be omitted.

The conveyor machine or devices shown in FIGS. 15–18 can transport fibres, sheet materials and liquids, besides powder, not only in the horizontal direction, but also in an obliquely upward direction and in the vertically upward direction with ease. The object matters can be further easily conveyed in an obliquely downward direction.

FIG. 19 shows a cylindrical three-phase contact type electric field curtain device 96 which has been constructed by bending a three-phase contact type electric field curtain device shown in FIG. 14 of this invention as multi-layer green sheet about an axis in the longitudinal direction so that a cylinder may be formed and the upper surface of said green sheet may come inside of a hollow cylinder. Said device 96 can be used for conveying or passivation-treating an introduced powder, sheet material, fibre, or liquid. In addition, the device can be employed for discharging these materials. In the device as shown, there are disposed annular three-phase electrodes 97, 98, 99, 97a, 98a, 99a rectangular to the axis of cylinder within dielectric beneath the inner wall surface of cylinder, as depicted by dotted lines. When u-phase voltage, v-phase voltage and w-phase voltage of three-phase A.C. high voltage from a three-phase A.C. high voltage source 70 are applied to said electrodes by way of terminal conductor parts 66, 67 and 68, a progressive wave non-uniform electric field is generated, which travels along the inner wall of the device 96 in the direction of arrow 72. Therefore, this device can be utilized for various applications as mentioned above. Furthermore, a discharge-chemical treatment (e.g. generation of ozone, oxidation of $NO_x$ or $SO_x$) can be performed by forming a plasma within the device 96 and passing a gas therethrough.

FIG. 20 illustrates a modification of the device of FIG. 19 wherein groups of three-phase electrodes 97, 98, 99 are arranged parallel to the axis of cylinder. As a result, a progressive wave non-uniform electric field which travels along the inner wall in the peripheral direction, i.e. rotates in a section, as shown by arrow 72 is generated. Accordingly, when powder, sheet material, fiber, liquid or the like is introduced within the cylinder, said material rotates violently in the direction of arrow 72 to be subject to mixing action, twisting action, passivation action etc. In the case of fiber, this action is utilized for twisting fibers and the resulting product can be removed from the other end of the device. Consequently, the device can be employed in spinning machine. Besides, the device can be used for agitating flame in engine or in combustion chamber to increase combustion efficiency, for performing dischargechemical treatment, for promoting chemical reaction by taking advantage of mixing and agitating actions, and for promoting chemical engineering operation, such as drying and material exchange.

FIG. 19 represents another modification of the device shown in FIG. 19 or 20, in which groups of three-phase electrodes 97, 98, 99 ... are obliquely arranged at angle to the axis of cylinder. A progressive wave non-uniform electric field travels helically along the inner wall of cylinder from the left end opening to the right end opening as shown by arrow 72. Accordingly, object material, such as pulverized or granular material, fiber, sheet material, and liquid, which is introduced from the left end is conveyed helically to the right. In the course of helical motion, the object material is subject to an agitating action by rotating and a twisting action. As the device of FIG. 21 is similar in function to the device of FIG. 20, the device can be employed in chemical and chemical engineering operations, e.g. combustion, drying, material exchange and promoting reaction, and in various discharge-chemical treatments.

FIG. 22 illustrates an example wherein one of devices shown in FIGS. 19–21 is being used to convey a dielectric liquid. A liquid which is introduced into a cylindrical three-phase contact type electric field curtain device of this invention through the left end entrance 89 is transported in the direction of arrow 86 by conveying action of progressive wave non-uniform electric field, and is expelled from the right end outlet 95. As such a fluid conveying apparatus can be inserted and operated in a medium or location where pressure conveying of fluid by other means is difficult, the apparatus can be used, for example, for embedding in human body to promote the circulation of the blood or the lymph fluid, for embedding in high-tension cable to convey as isolating coolant, for conveying a reagent in an analytical instrument, for conveying reaction liquids in a reaction apparatus, and for circulating and heating liquids in a large-scale tank (e.g. oil tank).

This heating effect accompanied by the conveying effect is one of remarkable characteristics of this invention. To this end, a kind of high-frequency induction heating is caused within the wall body of cylindre 96 by selecting a fine ceramic material having large dielectric loss along with increasing frequency of three-phase A.C. current. Otherwise, one, two or three phase groups of three-phase electrodes are supplied with a different current for heating by Jonle heat. Besides electrodes for heating can be provided separately from three-phase electrodes. When the liquid to be conveyed in itself has a dielectric loss, said liquid is induction heated in the interior, especially in the vicinity of inner wall, of cylinder 96 due to progressive wave non-uniform electric field, without special provisions mentioned above. As a result, the viscosity of said liquid lowers and the capability for being transported of liquid is increased. The device with or without such provisions is effectively applicable to transporting by pipe of crude oil, especially in cold district. The inner wall of transport pipe may be paved with devices of FIG. 15 or 16, or the inner wall itself may be composed of devices shown by FIG. 22.

In addition, when a mixture of liquids having different densities, such as oil and aqueous liquid, is introduced into the device of FIG. 20, the mixture can be separated by centrifugal force caused by rotating. In the device of FIG. 21, separating is performed in the course of transporting.

On the other hand, the device of FIG. 19 can be utilized to accelerate electron or ions, provided that the frequency of the source is increased. The device of FIG. 20 can be utilized for centrifugal separation due to difference in mass. For example, a gaseous uranium compound is ionized and the isotopes are separated.

FIG. 23 shows an example wherein a cylindrical three-phase contact type electric field curtain device according to this invention is used to compose a heat pipe. In the drawing, reference numeral 96 designates a cylindrical three-phase contact type electric field curtain device shown in FIG. 19 and 22. At both ends of device are provided containers 100, 101 for working fluid, said containers having the respective heat transfer surfaces 102, 103. When the device 96 is fed with a three-phase A.C. high voltage from a three-phase A.C. high voltage source 70 by way of terminals 66, 67, 68 and a progressive wave non-uniform electric field is generated in the direction of arrow 86, the working fluid collected in the container 100 positioned in cold part is conveyed to the right upward along the inner wall of cylinder 96 and flows into the container 101 positioned in hot part. The working fluid in container 101 is heated by the heat introduced through heat transfer surface 103 to evaporate, moves then as gas through interior of cylinder 96 in the direction of arrow 104, and is condensed upon contacting with heat transfer surface 102 of container 100 to collect in the lower part of container 100. Through this circulation, heat is effectively and rapidly transmitted from heat transfer surface 103 to heat transfer surface 102 A hot area is cooled by heat transfer surface 103 and a cold area is heated by heat transfer surface 102. As shown by FIG. 24 in this case, a cylinder having small diameter may be used as cylinder 96 for conveying working fluid and one or more such cylinders may be arranged parallel to each other within a different cylinder 104a for returning of gas, with the intention of making the transportation of liquid more effective. Otherwise, a separate cylinder for solely returning gas may be arranged parallel to and out of the cylinder 96 or cylinders.

FIG. 25 represents an example of application wherein a cylindrical three-phase contact type electric field curtain device 96 of FIG. 19 according to this invention is utilized to compose a powder painting apparatus for coating the inner surface of a metal pipe. In the drawing, reference numeral 105 indicates a slender transport pipe composed of said electric field curtain device 96 The upper part of the transport pipe has a hopper section 106 which is also composed of three-phase contact type electric field curtain device having three-phase electrode groups. The lower part of the transport pipe has a corona discharge electrode 107 of needle form which protrudes within a metal pipe 108 to be painted. Said discharge electrode 107 is insulated from transport pipe 105 and is attached to the tip thereof. A negative D.C. high voltage from a D.C. high voltage source 109 is impressed on said corona discharge needle by way of a high-tension cable 110 attached to the outside surface of transport pipe 105. The corona discharge needle emits a negative corona discharge toward the inner surface of grounded metal pipe 108. Reference numeral 70 denotes a three-phase A.C. high voltage source. A three-phase A.C. high voltage therefrom is impressed on transport pipe 105 and on hopper section 106 by way of terminals 66, 67, 68, and progressive wave non-uniform electric fields in the directions of arrows 111, 112 are formed along the inner walls thereof. When a powder of a thermoplastic resin is fed into the interior of hopper section 106 from a powder tank 113 via a feed pipe 114 and a dispersing cone 115, said powder is transported downward within cylinder 105 under the action of said progressive wave electric field and, at the lower end of the cylinder, is negatively charged by negative ions given from corona discharge needle 107. The negatively charged powder is driven by an electric field between discharge needle 107 and metal pipe 108 and adheres to inner wall of metal pipe 108 to stack. Consequently, when the metal pipe 108 is allowed to descend gradually in the direction of arrow 116, an electrostatic accumulation layer of plastic powder is continuously formed on the inner surface of metal pipe. Accordingly, when the metal pipe 108 is pulled down to separate completely from the transport pipe and is heated, said layer of plastic powder is fused to form a coating on the inner surface.

FIG. 26 represents an example of application wherein a three-phase contact type electric field curtain device 75 of one-phase-exposed type shown in FIG. 17B according to this invention is employed in an electrostatic powder painting apparatus. In the apparatus, said devices which are so disposed that the surfaces 71 provided with electrodes may face always inward constitute vertical walls 117, 118 and lower inclined walls 119, 120. Each of devices is fed with a three-phase A.C. high voltage, which is higher than the corona initiation voltage Vc, from a three-phase A.C. high voltage source 70. In addition, a D.C. high voltage which comes from a grounded D.C. high voltage source 30 and is less higher than that of the earth is applied to the neutral point of the source 70. While a substrate 122 suspended from a grounded rail 121 above descends into the interior of the apparatus, a powder is introduced from the lower end by way of a pipe 123 and a T-formed inlet 124. The powder is conveyed upward along inclined walls 119, 120 under the action of the progressive wave non-uniform electric field in the apparatus, and then is elevated along vertical walls 117, 118. In the meantime, a negative ion current passes by action of D.C. field from plasma generated along inner faces of inclined walls 119, 120 and vertical walls 117, 118 to substrate 122. The powder is negatively charged by bombardment of said negative ion current, and is driven under the action of D.C. field to the surface of grounded substrate 122 to adhere thereon. Particles which have not adhered fall downward and are conveyed upward in the same manner as mentioned above, to re-enter into coating operation! Upon completion of operation, the coated substrate 122 is introduced in an oven and baked to form a finished paint coating on the surface.

FIG. 27 shows an example of application wherein three-phase contact type electric field curtain devices 69 shown by FIG. 15 or 16 of this invention are employed to pave the entire inner wall of a booth 126 for powder painting, and are utilized for sweeping off powder particles collected and adhered on the inner walls of booth in order to convey them to a recovery trough for collecting. In FIG. 27, reference numerals 127–138 indicate said devices used in paving inner wall of booth 126. It is so constructed that, upon closing a switch 139, the devices are connected to a three-phase A.C. high voltage source 70 and pregressive wave non-uniform electric fields are caused to travel in the direction of arrows 147–145. When this is a case, all powder layers 147–150 adhered on inner wall are violently peeled and repelled by the action of said progressive wave non-uniform electric field and are conveyed downward, said powder layers having been built up by particles remaining of charged painting powder ejected from a spray gun 146 against a grounded substrate 122. The conveyed powder is collected on electric field curtain devices 151 for horizontally transporting, with which an underside trough is paved. Then, the switch 152 is closed. Thereupon, a horizontal progressive wave non-uniform electric field is generated in the direction perpendicular to the plane of the section by closing a switch 152. By virtue of generated field, powder particles on electric field curtain devices 151 are conveyed to an outlet 153 to collect in a recovery trough.

FIG. 28 represents an example of application in which three-phase contact type electric field curtain devices 69 of FIG. 15 or 16 are used to construct an electromechanical sorter for separating a powder mixture consisting of three different ingredient powders. In FIG. 28, reference numeral 153 designates a plate which has been constructed with devices 69 shown in FIG. 15 or 16 and is so inclined that this side of plate may be lower. Each of three-phase electrode groups is arranged so as to align with the direction of inclination, as shown by a dotted line. The u-phase voltage, the v-phase voltage and the w-phase voltage of a three-phase A.C. high voltage from a three-phase A.C. high voltage source 71 are impressed in phase sequence as shown in FIG. 28. As a result, a progressive wave non-uniform electric field which travels along the surface of plate 153 to the right is generated as repeatedly mentioned above. However, this electric field can be split into numerous rotating progressive waves which travel to the right or to the left, such as primary rotating progressive wave toward right (first mode), primary rotating progressive wave toward left (second mode) and secondary rotating progressive wave toward right (third mode) ... Among charged particles, ones which can not follow anyone of waves due to particle's characteristics determined by particle's diameter, mass, and charge remain rotating without travelling. Particles capable of following the first mode are carried to the right. Particles capable of following the second mode are carried to the left, and so forth. Thus, when a mixture of three different powders of aforementioned particle types is dropped on upper central part plate 153 from a hopper 113 through a feed pipe 114, particles of first type roll down straight along the inclined plane of plate 153 and are collected in a hopper 155 Particles of second type are carried to the right during rolling down and enter a right-hand chute 156. Particles of third type are carried to the left during rolling down and enter a left-hand chute 157. Thus, three different ingredients of a powder mixture can be completely separated merely by an electro-mechanical procedure.

FIG. 29 represents a modification of the three-phase contact type electric field curtain device shown in FIG. 15, in which powder particles being conveyed receive simultaneously monopolar charges to enhance the conveying effect. Each of three-phase electrodes 57, 58, 59 ... is divided into two electrodes, i.e. a pair of electrodes, such as 57a and 57b, 58a and 58b, 59a and 59b, as shown on the drawing A pair of one phase electrodes a and b are connected each other by an inserted high resistance. U-phase, v-phase and w-phase voltages are applied to pairs three-phase electrodes 57a–57b, 58a–58b, 59a–59b ... by connecting to a three-phase A.C. high voltage source 70 via terminals 66, 67, 68. A progressive wave non-uniform electric field which travels in the direction of arrow 72 on the surface 71 is generated. Thereupon, a pulse high voltage from a pulse high voltage source 161 is applied between paired electrodes a, b of the same phase within a period of time wherein the potential of said pair of the same phase is less or more high than both those of adjacent pairs of electrodes. As a result, an electrodeless pulse corona discharge is generated in gaseous space above said pair to produce plasma. From this plasma are emitted monopolar negative or positive ions toward adjacent electrodes. These ions bombard particles of pulverized or granular material or liquid from above to charge them negatively or positively. Simultaneously, said particles are conveyed in the direction of arrow 72. By this modification, it has become feasible that a material to be conveyed is always intensely charged and is more effectively conveyed.

FIG. 30 shows a modification of the electric field device in FIG. 29. Grounded corona discharge electrodes 162, 163, 164 ... of thin wire shape which protrude from surface 1 into the gaseous space above are disposed between every paired electrodes of same phase 57a–57b, 58a–58b, 59a–59b .... As a result, a more intense corona discharge is generated and a charging performance increases, as compared with the case when a pulse high voltage is applied between paired electrodes a, b. It results in enhancement of conveying effect.

FIG. 31 shows an example of application wherein electric field devices shown in FIGS. 1E and 1F, or 17A and 17B are employed for conveying a pulverized or granular material. The underside and the upside of an inclined flume having rectangular section are paved with said electric field devices 166, 166a ... and 167, 167a ... respectively. Single-phase A.C. high voltages from single-phase A.C. high voltage sources 168, 169 are applied to underside electrodes and upside electrodes, respectively. A standing-wave non-uniform alternating electric field is formed on the surface, which faces the interior of the flume, of respective electrode group. When a pulverized or granular material is fed to an inlet 170 situated on the left-hand side above, the material advances into the flume, contacts immediately with electric field device group 166, 166a .., is charged by contact, is violently repelled to float, is conveyed to the right downward as shown by arrow 171, and finally is expelled through an outlet 172. In this case, if a D.C. high voltage source 173 or an A.C. high voltage source 174 is inserted between the neutral points of output side or between output terminals of A.C. sources 168, 169 by way of a switch 175, a D.C. high voltage electric field or an A.C. high voltage field is generated between electric field device groups 166, 166a ... and 167, 167a ..., and said conveying action is widely increased. In this case also, when A.C. output voltages of sources 168, 169 are increased above the corona initiation voltage Vc at the surfaces of said electric field devices to form plasma on the surfaces, the conveying action is enhanced As the case may be, the flume 165 is provided only with underside electric field devices 166, 166a .... The upside devices 167, 167a and the electric sources 169, 173, 174 can be omitted Furthermore, in the case of aforementioned electric field devices (including devices of FIG. 1E, FIG. 1F, FIG. 5, FIG. 6, FIG. 7, FIG. 8, FIG. 11, FIG. 14, FIG. 15, FIG. 16, FIG. 17A, FIG. 17B, FIG. 18, FIG. 19, FIG. 20, FIG. 21, FIG. 22, FIG. 25, FIG. 26, FIG. 27, FIG. 28, FIG. 29, FIG. 30 and FIG. 31), the air above the surface of device can be replaced by an inert gas, such as $N_2$, $CO_2$, $H_2O$ and combustion gases, in order to prevent ignition of a material to be conveyed. A dry gas can be fed for increasing conveying effect. A mechanical vibration of electric field device may be caused by a suitable vibrator for promoting transportation. Optionally, an electric field device is provided with a large number of small holes penetrating through device itself to feed a gas from the back side to the upper surface of device, for promoting repelling and floating of particles by hydrodynamic means.

FIGS. 32-37 represent electric field devices as ion source, wherein a very long transmission line or lines are disposed on a surface of a fine ceramic dielectric body as linear corona discharge electrode, one end of said transmission line being provided with an input terminal for apply a voltage. This structure of discharge electrode is especially appropriate for using a very short-time pulse high voltage of about 1 ns–1000 ns in pulse length as impressed voltage. In this case, a pulse voltage runs from input end as progressive wave with generating intense pulse corona discharge, and plasma is formed. A discharge caused by pulse high voltage having such a steep rise has an especially active discharge-chemical action, and is suitable to be utilized in an ozonizer or in oxidation of $NO_x$, $SO_x$ or the like.

In the embodiment shown in FIG. 32, two parallel long transmission lines 176, 177 of narrow strip form as linear corona discharge electrode (hereinafter, referred to as "corona transmission line") are disposed to meander on a rectangular fine ceramic dielectric plate 1, in accordance with the method of invention. The aforementioned very short-time pulse high voltage from a very short-time pulse high voltage source 180 is impressed on the device via its input terminals 178, 179. The impressed voltage propagates along transmission lines 176–177 to the ends 181, 182. In the course of this propagation, an active plasma as mentioned above is generated between transmission lines 176 and 177. When the ends 181, 182 are open as shown on the drawings, a progressive wave voltage is reflected. However, when a resistance equal to surge impedance of transmission lines is inserted between both ends, the reflection will be eliminated.

Figure 32:
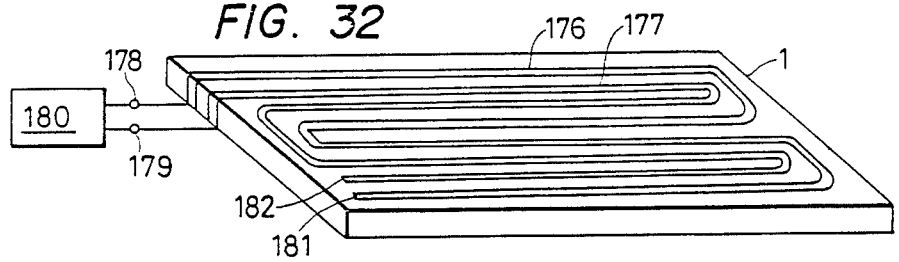
Figure 33:
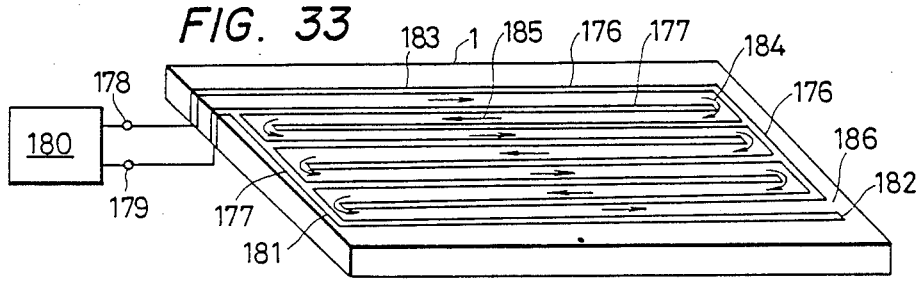

FIG. 33 represents a modification of the device in FIG. 32, in which electrodes 176, 177 are disposed in interdigitated relation, as shown on the drawing. In this case, the progressive wave travels as shown by arrows 183–183–185 ... to the end 186.

Figure 34:
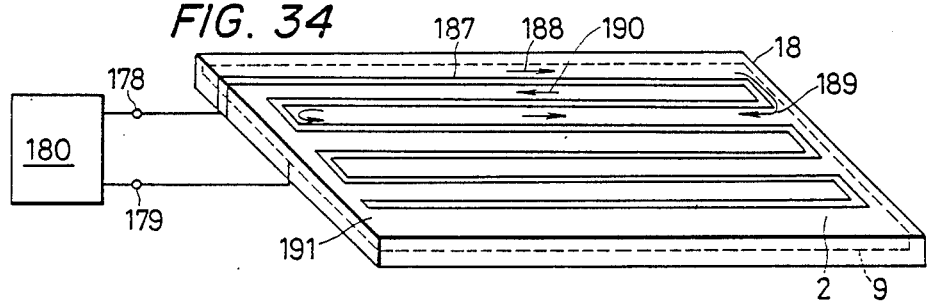

FIG. 34 shows an electric field device produced by technique depicted by FIGS. 1 wherein a planar induction electrode 9 is embedded within a rectangular fine ceramic dielectric plate 18, and along linear corona discharge electrode 187 of strip form is arranged on a surface 2 of dielectric plate 18 to meander, so that parts of the line may be parallel to each other and equidistant, whereby electrode 187 and planar induction electrode 9 beneath it form transmission lines via dielectric layer. When said very short-time pulse high voltage is applied between terminals 178 and 179, a progressive wave high voltage runs as shown by arrows 188–189–190 ... to the end 191. While the voltage wave proceeds, a creeping corona discharge is generated along surface 2 of dielectric body from the corona discharge electrode 187 of narrow strip form to both sides thereof and an active plasma as referred to above appears.

Figure 35:
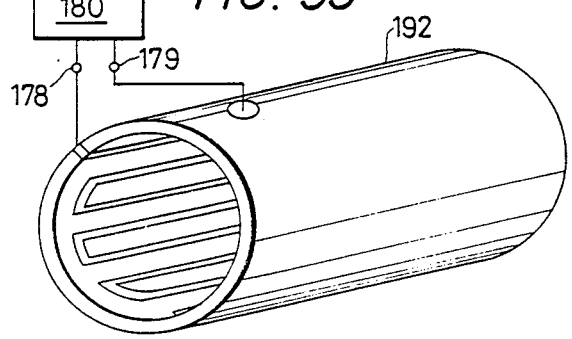

FIG. 35 shows a cylindrical electric field device 192 which has been constructed by bending an electric field device of FIG. 34 about a lengthwise directed axis, so that the upper surface may come inside. FIG. 36 shows a similar cylindrical electric field device 193 which has been constructed bending the same, so that the upper surface may come outside. In these devices, an active corona is generated along the inner or outer surface, respectively.

FIG. 37 illustrates a modification of electric field device in FIG. 36 wherein a long linear corona discharge electrode is arranged to form helix on the surface of a fine ceramic cylinder 193. Transmission lines are formed by a cylindrical induction electrode embedded within cylinder 193 and the helical corona discharge electrode 194. When a very short-time pulse high voltage is applied between two said transmission lines by way of terminals 178, 179, a progressive wave travels with depicting a helix along electrode 194, and active coronas are generated on right and left sides of electrode. In this embodiment, the electrode 194 is printed on the outer surface of green cylinder which has been shaped from a green sheet.

FIG. 38 illustrates an apparatus in which electric field devices according to this invention are employed as ion source. The apparatus can be utilized for oxidizing $SO_x$, $NO_x$ etc. in waste combustion gases from motorcar engine, boiler etc., or for generating ozone. In the apparatus, a number of electric field devices, e.g. shown in FIG. 1E, FIG. 1F, FIG. 17A, FIG. 17B, FIG. 32, FIG. 33 and FIG. 34, especially electric field devices 195 of FIG. 34 having long corona discharge electrodes 187 of narrow strip form on both surfaces of a fine ceramic dielectric plate 18, are arranged parallel to the gas current in a gas duct 196. A very short-time pulse high voltage is applied between corona discharge electrode 187 of narrow strip form and embedded planar induction electrode 9 of each electric field device 195 from a very short-time pulse high voltage source 180 by way of terminals 178, 179. Thus, active plasma is generated on both sides of all electric field devices 195 When a waste combustion gas containing noxious components, such as $SO_x$ and $NO_x$ is passed through the duct 196 from inlet on this side in the direction of arrow 197, these components are oxidized due to discharge-chemical action of said plasma to form $SO_3$ and $NO_2$, which are easily removed by wet process. In addition, when a minute amount of ammonia is added to said waste gas at the entrance, ammonia combines with said components to generate an aerosol of double salts of ammonium sulfate-nitrate. Thus-formed aerosol can be easily collected by means of an electrostatic precipitator arranged downstream to remove. Furthermore, if a layer including an ingredient having catalytic action is disposed on surfaces of fine ceramic dielectric body of each electric field device 195, $NO_x$ and $NH_3$ can be double decomposed to obtain $N_2$ and $H_2O$. On the other hand, when dry air or oxygen is introduced as gas to be treated into the apparatus, ozone can be generated. For this purpose, each planar induction electrode 9 embedded in fine ceramic plate should be formed hollow and air or water should be passed through the interior of electrode to cool each electric field device 195.

In the apparatus shown in FIG. 38, any of electric field devices having cylindrical shape or any other shape according to this invention, such as those illustrated in FIG. 3, FIG. 5, FIG. 5, FIG. 6, FIG. 35, FIG. 36, and FIG. 37, can be effectively disposed in the gas duct 196 in place of an electric field device 195 of plate shape.

FIG. 39 illustrates an example of application wherein a number of, electric field devices according to this invention, as ion source, are disposed in a fluidized bed 199 of a powder of a material having high resistivity for preventing intense electrification of particles due to fluidization and adhesion of particles to wall. In the drawing, reference numeral 198 designates a fluidized bed vessel in which slits for gas flow, e.g. perforated plate 200, are laid in the lower part. A gas from a gas inlet 201 is forced to pass through said perforated plate 200 and fluidizes a powder of a material having high resistivity in the space 202 above said plate to form a fludized bed 199. Reference numerals 203, 203a designate electric field devices of FIGS. 1 as ion source, which are disposed along the inner walls of vessel 198. Reference numerals 204, 204a ... designate electric field devices 27 of FIG. 7A having corona discharge electrodes of strip form on both sides as ion source, which have been installed vertically, equispaced, and parallel to one another in the space 202. By application of an A.C. high voltage from an A.C. high voltage source 19 between the corona discharge electrode and the embedded planar electrode of each of all above-mentioned electric field devices, plasma is formed on external surfaces of the devices The charge of powder which has been caused by fluidization in the space 202 is removed by virtue of formed plasma, and adhesion of particles to inner walls of vessel 198 by electric force as well as any coagulation of powder itself is effectively prevented FIGS. 40 and 41 illustrate examples of application wherein an electric field device of this invention is used as ion source in an electrostatic precipitator. Although all ion source electric field devices mentioned above can be employed for the purpose, the device shown by FIG. 34 is used in these examples.

FIG. 40 represents a single-stage electrostatic precipitator from which a duct for gas passage is removed. Reference numerals 205, 206 denote grounded plate form dust collecting electrodes. Reference numeral 207 denotes an ion source electric field device illustrated in FIG. 34 which has a long corona discharge electrode 187 of strip form on both surfaces of a fine ceramic dielectric plate 18. A planar induction electrode 9 embedded within body and a corona discharge electrode 187 are equal in D.C. potential because of both electrodes being connected to a high resistance 208 by way of terminals 179, 178. In addition, a negative D.C. high voltage is applied to planar induction electrode 9 and corona discharge electrode 187 by connecting the terminal 178 to a negative D.C. high voltage source 210 via an inductance 209, in contrast with grounded dust collecting electrodes 205, 206. Reference numeral 180 denotes a pulse high voltage source which applies a pulse high voltage between terminals 178 and 179 by way of coupling condensers 211, 213, and thereby causes corona discharge electrode 187 to generate creeping pulse corona discharge along surfaces on both sides of ceramic dielectric body 18. Thus, a planar plasma ion source is formed. Negative ions are removed from this plasma ion source under the action of a D.C. electric field formed in dust-collecting spaces 213, 214 between corona discharge electrode 187 and dust collecting electrodes 205, 206, and flow toward dust collecting electrodes 205, 206. When a dust laden gas is introduced into dust-collecting spaces 213, 214 in the direction of arrow 215, dust particles in gas are bombarded by said negative ions and are intensely, negatively charged. The negatively charged particles are immediately separated and collect cd on the surfaces of dust collecting electrodes 205, 206 by coulomb force. The clean gas is expelled outside in the direction of arrow 216. Dust particles collected on and adhered to dust collecting electrodes 205, 206 are released by hammering to fall into a lower hopper not shown in the drawing. Inductance 209 inhibits the applying of pulse voltage to a negative D.C. high voltage source 210.

FIG. 41 shows a two-stage electrostatic precipitator from which a duct for gas passage is removed. Reference numeral 217 denotes a charging section having a structure similar to that shown in FIG. 40, but the size in the direction of gas flow being short. In this charging section, dust particles of a dust laiden gas flowing in the direction of arrow 215 are negatively charged. Reference numeral 218 denotes a collecting section comprising a group of parallel planar electrodes 219, 220, 221, 222, 223 .... Every other electrode 219, 221, ... is grounded The remaining intermediates electrodes 220, 222 ... are insulated and a negative D.C. high voltage is applied to them by a D.C. high voltage source 224 Consequently, uniform D.C. electric fields are formed in dust-collecting spaces between grounded electrodes 219, 221 ... and negative D.C. high voltage electrodes 220, 222 .... When dust particles which have been negatively charged in the charging section 217 flow into the collecting section with floating in gas, said dust particles are immediately separated and collected on grounded electrodes 219, 221 ... having, so to speak, positive polarity. Cleansed gas is expelled out side in the direction of arrow 216.

In the apparatus shown in FIGS. 40, 41, a planar ion source, as ion source, can be formed by virtue of utilizing an electric field device of fine ceramic body according to this invention. Thus, the charging efficiency and the dust-collecting efficiency resulting therefrom can be remarkably increased, as compared with the case when a prior corona discharge electrode of strip form is used.

Various electric field devices according to this invention can be provided with a number of small holes penetrating through the device and thereby permit to feed air, a gas or a liquid from back side to front through said small holes. By this means, the adhesion of a powder to the surface can be prevented and any electromechanical effects for handling a powder, such as repelling, floating and transporting, are enhanced When this electric field device is employed for promoting a reaction, the small holes can be utilized as inlet for an object gas. In some cases, an electric discharge is caused within small hole to obtain a special effect. In certain cases, an inert gas is fed to an electric discharge area through small holes to prevent ignition and explosion due to discharge. These are examples of numerous possible applications Thus, the provision of small holes penetrating through the device constitutes one important feature of this invention.

FIGS. 42 show an example of above-mentioned perforation applied to the electric field device shown in FIGS. 1A-1F. FIG. 42A is a perspective view of a perforated electric field device, partly showing a section. FIG. 42B is a detail drawing of a part about a small hole. An electric field device shown in FIG. 42A has a large number of equidistant small holes 226 in the areas between strip-shaped corona discharge electrodes 3 and 4, 4 and 5 .... To make this device, corona discharge electrodes are printed on the upper surface of upper layer green sheet 1 as mentioned in the explanation of FIGS. 1A-1F. In screen printing of planar induction electrode 9 on the lower surface of upper layer green sheet 1, it is necessary to leave a circular not printed area 225 around every pre-determined position of said small hole, the diameter of said circular not printed area being larger than that of small hole to be provided Thereafter, an upper layer green sheet 1 and a lower layer green sheet 10 are press bonded. Then, small holes 226 are formed by punching, and the whole is sintered. When air or gas is ejected in the direction of arrow 227 from below through small holes 226 of thus-formed sintered ceramic dielectric plate 18 onto the upper surface 2 thereof where plasma is generated around corona discharge electrodes 3, 4, 5 ..., the aforementioned effects can be obtained. Small holes 226 may be arranged within corona discharge electrodes 3, 4, 5 .... In any of these cases, an induction electrode 9 should have a vacent circle around a small hole 226, the diameter of said circle being larger than that of small hole, in order to prevent exposing of induction electrode 9 to the small hole. Thereby, an occurrence of spark between induction electrode 9 and electrode 3, 4 or 5 can be inhibited.

FIG. 43 represents an air slide conveyor composed of three-phase contact type electric field curtain devices of one-phase-exposed type, as shown in FIG. 16, which are provided with a number of small holes. In the drawing, reference numeral 69 denotes a three-phase contact type electric field curtain device of one-phase-exposed type. Upon applying a three-phase A.C. high voltage from a three-phase A.C. high voltage source 70 to electrodes 53, 54, 55, 53a, 54a, 55a ... by way of terminals 66, 67, 68, a progressive was non-uniform electric field travelling in the direction of arrow 228 is generated. Reference numeral 226 designates many small holes disposed in every space between electrodes of electric field device 69. Air is spouted through said small holes 226 toward above the device when air is forced to flow through an inlet 230 to an air chamber 229 arranged beneath small holes 226. When electric field curtain devices 69 are arranged on the underside of flume 231 and a powder is made to fall from an inlet 232 located on the left side above, the powder immediately contacts with the upper surface of electric field curtain device 69 to charge and is repelled The repelled particles of powder float under the combined actions of said progressive wave non-uniform electric field and said spouted air, are conveyed in the direction of arrow 228, and are expelled out from an outlet 223. In this case, floating and conveying are widely enhanced by the action of spouting air. Furthermore, whereas a usual air slide conveyor is provided with a slant and conveying obliquely downward only is possible under the action of gravitational force, conveying obliquely upward, to say nothing of horizontally, is possible with this embodiment of this invention. If a suitable preliminary charging device is disposed within inlet 232 to charge preliminarily to entering powder, charging of powder by contact with the electric field curtain device 69 becomes unnecessary. Thus, a powder having high adherence or a wet powder can be conveyed without contacting.

FIG. 44 shows a modification of device shown in FIG. 42, wherein a number of slits are provided in place of small holes. This electric field device 234 is composed of many modules 235 arranged parallel and equidistant. This module 235 comprises a rectangular fine ceramic dielectric body 236 having rectangular cross section. Said dielectric body has an induction electrode 237 embedded in itself, and filmy electrodes 238, 239 on both sides. The sharp upper edges 240, 241 of said filmy electrodes constitutes corona discharge electrodes. When an A.C. high voltage is applied between the electrodes 238, 239 and an embedded induction electrode 237 from an A.C. high voltage source 19 via terminals 15, 16, a creeping corona discharge runs from sharp upper edges 240, 241 inward along the upper surface of dielectric body 236 and plasma as ion source is generated. A space 242 between two modules adjacent to each other serves as a slit for passing air or a gas in the direction of arrow 243. Thus, the device 234 has a function quite similar to that of device in FIGS. 42.

FIG. 45A represents another example of structure of perforated electric field device, which has a planar electrode 245 on the upper surface of a fine ceramic dielectric body plate 244 and further another planar electrode 246 embedded in the body. In addition, a number of small holes 266 penetrates through these planar electrodes 245, 246 and the fine ceramic dielectric body plate 244. In this instance, inner peripheral parts 247, 248 of electrodes 245, 246 are exposed to the interior of small holes 226, as shown by FIG. 45B. When a very short-time pulse high voltage from a very short-time pulse high voltage source 180 is applied between both electrodes, a creeping corona discharge is generated along the inner wall surface of small hole 226 between inner peripheral parts 247 and 248. This corona discharge acts as plasma ion source to feed ions on the upper surface of the dielectric body plate 244. If air or a gas is passed upward through small holes 226 from below, various aforementioned effects are obtained.

FIG. 46 shows a modification of the device shown in FIG. 45, in which the fine ceramic dielectric body 244 has a planar electrode 245a also on the lower surface thereof Thus, the discharge along the inner surface of small hole 226 is directed upward and downward from peripheral part 248. Therefore, when a gas is fed through small holes 226, a discharge-chemical action is doubled, as compared with that in the device of FIG. 45. On the other hand, when a charged liquid is passed through small holes 226, the electric charge is effectively removed.

FIG. 47 represents a modification of the device shown by FIG. 46 wherein a very short-time pulse high voltage from a very short-time pulse high voltage source 180 is applied between an upper planar electrode 245 and an inner embedded planar electrode 246 by way of terminals 15, 16 to generate plasma in the upper half of every small hole 226, and additionally a D.C. high voltage from a D.C. high voltage source 249 is applied between electrode 246 and lower planar electrode 245a via terminals 16, 250, thereby a monopolar ion supply source is constituted, which feeds downward selectively negative ions in the case of wiring shown in FIG. 47. This device is employable for supplying charges of required polarity, i.e. negative or positive, uniformly on the surface of photosensitive material having photoconductivity for an electronic photography. When this is a case, the intensity of current can be modified as desired by changing the voltage of the D.C. voltage source 249.

FIG. 48 shows an apparatus using a modification of the device in FIG. 47 wherein separate annular discharge electrodes 251, 252, 253 ... are disposed around respective small holes so that the inner peripheral part of electrode may be exposed to the interior of small hole, ±n place of the upper planar electrode 245. When a signal pulse high voltage from a pulse source 257 is applied between the embedded planar electrode 246 and each of said annular electrodes by way of terminal 16 and terminals 254, 255, 256 ... to generate a plasma in the upper half of each small hole, monopolar ions of prescribed polarity (in this embodiment, negative) are attracted downward under the action of a D.C. electric source 249 and reach a target 259 placed below to which a further higher potential is applied from a D.C. electric source 258 Assuming that the target 259 is a surface of a rotating drum composed of photosensitive material having photoconductivity, an electrostatic latent image of a letter (or a pattern) consisting of dots can be formed on the surface 259 by giving pulse signals corresponding to said letter to terminals 254, 255, 256 .... After a toner is electrostatically displaced thereto, the image is transferred on a paper and fixed to form an electronic photograph.

FIG. 49 shows a structure of an electric field attaching apparatus, or electrostatic chuck for attaching and fixing paper, plastic sheet, machine part etc., wherein an electric field device illustrated in FIGS. 1A–1F is used. Reference numeral 18 in the drawing denotes a fine ceramic dielectric plate having a slight electric conductivity. Electrodes 3, 4, 5 ... of strip form are disposed on the surface of the plate and a planar induction electrode 9 is embedded in said fine ceramic dielectric plate. A D.C. voltage is applied thereto from a D.C. electric source 30 via a switch 260. When an object 261, such as paper, sheet material and machine part, is attached to the right-hand surface of the plate, negative charge is transferred from electrodes 3, 4, 5 to the object 261 and appears on the surface confronting the dielectric plate 18 of the object 261. Said negative charge is attracted by the induction electrode 9 of positive polarity so that the object is firmly fixed on the dielectric plate 18. If a switch 260 is changed over to the earth side, the object 261 loses immediately the attracting force to be detachable.

FIG. 50 shows one example of application of electric field attaching apparatus 18 shown in FIG. 49. On said attaching apparatus is attached a sheet of paper or a plastic sheet material 261 to fix. When a picture or letters are written on the plastic sheet material 261 by means of a magnetic brush 263 which has been formed by attracting an iron power having adhered coloring toner particles with a grounded magnet 262, coloring toner particles attached to iron powder by charging due to contact are transferred onto the sheet material 261 under the attracting action of the planar electrode 9. After removing the sheet material from the apparatus 18, it is heated by irradiating with infrared ray or the like method. The picture or letters on the sheet material 216 are fixed. Such an image forming can be achieved in the same manner, even if electrodes 3, 4, 5 of strip form are eliminated from the surface of ceramic dielectric plate 18. FIG. 51 shows a modified apparatus as mentioned above. As illustrated in FIG. 52, when a picture or letters are written on a sheet material 261 with a grounded metal pen, negative charge passes from the metal pen onto the sheet material 261 and an electrostatic latent image corresponding to said picture or letters is formed. After releasing the sheet material from the device 18, the surface of sheet material is swept with a magnetic brush including toner. As a result, the toner is transferred onto the electrostatic latent image to develop When heated, a fixed picture or fixed letters are formed on sheet material 261.

The operation of the device composed of fine ceramic according to this invention is frequently accompanied by heating. For example, when it is intended that a viscous liquid is conveyed through the device for conveying liquid shown in FIG. 22, viscosity of the liquid lowers by heating a cylindrical three-phase contact type electric field curtain device 96, and conveying will be performed without difficulties. To this end, separate currents for heating may be supplied to electrodes for forming electric field from a different D.C. or A.C. electric source, or electromagnetic induction may be utilized Heat is generated in electrodes due to Joule heat. This is also an important feature of this invention.

Especially in the case of application shown by FIG. 22, the cylindrical electric field device 96 which is the same as that of FIG. 19 may be surrounded by a coil. When a high-frequency A.C. current flows through said coil, different high-frequency A.C currents flow in annular electrodes 97, 98, 99, 97a, 98b, 99c ..., to perform easily heating.

What is claimed is:

1. An electric field device comprising:
    an upper and a lower sheet;
    said sheets made of the fine ceramic material and joined in a unitary body;
    an elongated corona discharge electrode provided on an upper surface of said upper sheet;
    a planar induction electrode provided between said upper sheet and said lower sheet subjacent said corona discharge electrode;
    surface means defining a hole through said lower sheet remote from the lateral edges thereof;
    a contacting conductor comprising a film-like coating of an electrically-conducting material formed concentrically with said hole on the upper surface of said lower sheet;
    a terminal conductor comprising a film-like coating of an electrically-conductive material formed concentrically with said hole on the lower surface of said lower sheet;
    conductor comprising an electrically-conductive material extending from said planar induction electrode through said hole to said terminal conductor, said conductor being integrally bonded to said planar induction electrode, said contacting conductor and said terminal conductor;
    wherein the electrically-conductive material of said contacting conductor, said terminal conductor and said conductor is the same, and said electrically-conductive material has a coefficient of expansion which is reasonably compatible with the coefficient of expansion of said fine ceramic material; and
    a power supply connected between said terminal and said corona discharge electrode.

2. The electric field device in claim 1 in which said electrically-conducting material is in particulate form as a result of depositing a dispersion of particles of said electrically-conducting material on said surface means prior to sintering of said lower sheet.

3. The electric field device in claim 1 in which said conductor is plated with a material capable of inhibiting oxidation of said electrodes.

4. The electric field device in claim 3 in which said material capable of inhibiting oxidation is a metal.

5. The electric field device in claim 3 in which said material capable of inhibiting oxidation is an insulator film of alumina.

6. The electric field device in claim 1 in which said electrically-conducting material is carbon fibers.

7. The electric field device in claim 1 in which said electrically-conducting material is semiconductor ceramic material.

8. The electric field device in claim 1 including another conductor and another conducting terminal, said another conductor comprising a film-like coating of an electrically-conducting material integrally bonded with said upper and lower surfaces and extending from said corona discharge electrode to said lower surface and said another conducting terminal is disposed on said lower surface and connected to said corona discharge electrode by said another conductor.

9. The electric field device in claim 1 in which said hole and said terminal are circular.

10. The electric field device in claim 9 in which said hole has a diameter of approximately 1 mm and said terminal has a diameter of approximately 10 mm.

11. A sintered ceramic electric field device comprising:

an upper and a lower sheet, said sheets made of unsintered fine ceramic material and joined to form a unitary body;

an elongated corona discharge electrode provided on an upper surface of said upper sheet and formed as a film-like coating of an electrically-conducting material integrally bonded with said upper surface;

a planar induction electrode provided between said upper sheet and said lower sheet subjacent said corona discharge electrode, said induction electrode being a film-like coating of an electrically-conducting material having a melting point substantially above the sintering temperature of said fine ceramic material, said induction electrode being integrally bonded after sintering of said body with at least one of a lower surface of said upper sheet and an upper surface of said lower sheet;

surface means defining a hole through said lower sheet remote from the lateral edges thereof;

a conductor comprising a film-like coating of an electrically-conducting material integrally bonded with said surface means after sintering and extending from said induction electrode through said hole to the lower surface of said lower sheet;

said electrically-conducting material having a coefficient of expansion that is substantially compatible with that of said fine ceramic material whereby repeated changes in the thermal energy level of the device will not result in delamination of the conductor from the sheet to which it is bonded or rupture the continuity of the conductor; and power supply connecting means electrically connected with said conductor for electrically connecting an external power supply with said conductor and said corona discharge electrode.

12. The electric field device in claim 11 in which said electrically-conducting material is in particulate form as a result of depositing a dispersion of particles of said electrically-conducting material on the surface adjacent thereto prior to sintering of said device.

13. The electric field device in claim 11 in which said electrodes and said conductor are made from tungsten and said fine ceramic material is alumina porcelain.

14. The electric field in claim 11 in which exposed areas of said electrodes and said conductors are plated with a material capable of inhibiting oxidation of said electrodes.

15. The electric field device in claim 14 in which said material capable of inhibiting oxidation is a metal.

16. The electric field device in claim 14 in which said material capable of inhibiting oxidation is an alumina insulator film.

17. The electric field device in claim 11 in which said electrically-conducting material is carbon fibers.

18. The electric field device in claim 11 in which said electrically conducting material is semiconductor ceramic material.

* * * * *

UNITED STATES PATENT AND TRADEMARK OFFICE
CERTIFICATE OF CORRECTION

PATENT NO. : 4,922,099

DATED : May 1, 1990

INVENTOR(S) : Senichi Masuda and Isamu Fukuura

It is certified that error appears in the above-identified patent and that said Letters Patent is hereby corrected as shown below:

```
Column 7, Line 23:
  After "therein" insert --.--;

Column 7, Line 43:
  After "furnace" insert --.--;

Column 8, Line 4:
  After "facilitated" insert --.--;

Column 8, Line 54:
  After "produced" insert --.--;

Column 9, Line 6:
  "airayed" should be --arrayed--;

Column 9, Line 15:
  After "farmed" insert --.--;

Column 11, Line 10:
  After "painting" insert --.--;

Column 11, Line 26:
After "body" insert --.--;

Column 13, Line 23:
  After "electrodes" insert --.--;

Column 13, Line 34:
  After "float" insert --.--;

Column 13, Line 54:
  After "are" delete --20--;
```

UNITED STATES PATENT AND TRADEMARK OFFICE
CERTIFICATE OF CORRECTION

PATENT NO. : 4,922,099

DATED : May 1, 1990

INVENTOR(S) : Senichi Masuda and Isamu Fukuura

It is certified that error appears in the above-identified patent and that said Letters Patent is hereby corrected as shown below:

Column 14, Line 28:
  After "surfaces" insert --.--;

Column 14, Line 31:
  After "effect" insert --.--;

Column 14, Line 47:
  After "above" insert --.--;

Column 14, Line 51:
  After "conveyed" insert --.--;

Column 19, Line 27:
  After "155" insert --.--;

Column 20, Line 38:
  After "enhanced" insert --.--;

Column 20, Line 41:
  After "omitted" insert --.--;

Column 21, Line 28:
  "183" second occurrence should be --184--;

Column 22, Line 18:
  After "195" insert --.--;

Column 23, Line 4:
  After "devices" insert --.--;

Column 23, Line 47:
  "collect cd" should be --collected--;

UNITED STATES PATENT AND TRADEMARK OFFICE
CERTIFICATE OF CORRECTION

PATENT NO. : 4,922,099
DATED : May 1, 1990
INVENTOR(S) : Senichi Masuda and Isamu Fukuura It is certified that error appears in the above-identified patent and that said Letters Patent is hereby corrected as shown below:

```
Column 23, Line 66:
  After "grounded" insert --.--;

Column 23, Line 68:
  After "224" insert --.--;

Column 24, Line 25:
  After "enhanced" insert --.--;

Column 24, Line 33:
  After "applications" insert --.--;

Column 25, Line 24:
  After "repelled" insert --.--;

Column 26, Line 16:
  After "thereof" insert --.--;

Column 26, Line 47:
  +-n should be --in--;
```

UNITED STATES PATENT AND TRADEMARK OFFICE
CERTIFICATE OF CORRECTION

PATENT NO. : 4,922,099   Page 4 of 4

DATED : May 1, 1990

INVENTOR(S) : Senichi Masuda and Isamu Fukuura

It is certified that error appears in the above-identified patent and that said Letters Patent is hereby corrected as shown below:

```
Column 26, Line 57:
  After "258" insert --.--;

Column 27, Line 46:
  After "develop" insert --.--;

Column 27, Line 59:
  After "utilized" insert --.--;

Column 28, Claim 1, Line 21:
  Before "conductor" insert --a--.
```

Signed and Sealed this

Thirty-first Day of December, 1991

*Attest:*

HARRY F. MANBECK, JR.

*Attesting Officer*   *Commissioner of Patents and Trademarks*